(12) United States Patent
Lin

(10) Patent No.: US 10,565,500 B2
(45) Date of Patent: Feb. 18, 2020

(54) UNSUPERVISED LEARNING USING NEUROMORPHIC COMPUTING

(71) Applicant: Intel Corporation, Santa Clara, CA (US)

(72) Inventor: Tsung-Han Lin, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 517 days.

(21) Appl. No.: 15/385,031

(22) Filed: Dec. 20, 2016

(65) Prior Publication Data

US 2018/0174053 A1 Jun. 21, 2018

(51) Int. Cl.
*G06N 3/08* (2006.01)
*G06N 3/063* (2006.01)

(52) U.S. Cl.
CPC ............. *G06N 3/088* (2013.01); *G06N 3/063* (2013.01)

(58) Field of Classification Search
CPC ......... G06N 3/088; G06N 3/049; G06N 3/063
See application file for complete search history.

(56) References Cited

U.S. PATENT DOCUMENTS

| 5,537,512 A * | 7/1996 | Hsia ..................... G06N 3/0635 706/39 |
| 2009/0313195 A1 | 12/2009 | McDaid et al. |
| 2013/0297541 A1 | 11/2013 | Piekniewski et al. |

OTHER PUBLICATIONS

EESR extended European search report issued in EP Patent Application No. 17201925.9 dated May 15, 2018 (3 pages).
Emre Neftci et al: "Event-driven contrastive divergence for spiking neuromorphic systems", Frontiers in Neuroscience, vol. 7, No. 272, Jan. 30, 2014, 14 pages.
Kendra S. Burbank: "Mirrored STDP Implements Autoencoder Learning in a Network of Spiking Neurons", PLOS Computational Biology, vol. 11, No. 12, Dec. 3, 2015, 26 pages.
Knag Phil et al: "A Sparse Coding Neural Network ASIC With On-Chip Learning for Feature Extraction and Encoding", IEEE Journal of Solid-State Circuits, IEEE Service Center, Piscataway, NJ, USA, vol. 50, No. 4, Searched (IPC) Jan. 20, 2015, 10 pages.
Steve Furber: "Large-scale neuromorphic computing systems", Journal of Neural Engineering, Institute of Physics Publishing, Bristol, GB, vol. 13, No. 5, Aug. 16, 2016, 14 pages.
Extended European Search Report for Application No. EP1720925. 9, dated May 23, 2018, 11 pages.

* cited by examiner

*Primary Examiner* — Austin Hicks
(74) *Attorney, Agent, or Firm* — Alliance IP, LLC

(57) ABSTRACT

A spiking neural network (SNN) is implemented on a neuromorphic computers and includes a plurality of neurons, a first set of the plurality of synapses defining feedforward connections from a first subset of the neurons to a second subset of the neurons, a second subset of the plurality of synapses to define recurrent connections between the second subset of neurons, and a third subset of the plurality of synapses to define feedback connections from the second subset of neurons to the first subset of neurons. A set of input vectors are provided to iteratively modify weight values of the plurality of synapses. Each iteration involves selectively enabling and disabling the third subset of synapses with a different one of the input vectors applied to the SNN. The weight values are iteratively adjusted to derive a solution to an equation comprising an unknown matrix variable and an unknown vector variable.

20 Claims, 19 Drawing Sheets find a vector $r$ that $r = A^{-1}y$ find a vector $r$ that $r = C^{-1}BA^{-1}y$ Given many data vector $x_1, x_2, \ldots \in \mathbb{R}^{M \times 1}$, find vector $a_1, a_2, \ldots$ and $D$ that minimizes
$\sum_i \left( \frac{1}{2} \|x_i - Da_i\|_2^2 + \lambda_1 \|a_i\|_1 \right)$

UNSUPERVISED LEARNING USING NEUROMORPHIC COMPUTING

TECHNICAL FIELD

This disclosure relates in general to the field of computer systems and, more particularly, to neuromorphic computing.

BACKGROUND

Artificial neural networks (or ANNs) are generally presented as systems of interconnected "neurons" which can compute values from inputs. ANNs represent one of the most relevant and widespread techniques used to learn and recognize patterns. Consequently, ANNs have emerged as an effective solution for intuitive human/device interactions that improve user experience, a new computation paradigm known as "cognitive computing." Among other usages, ANNs can be used for imaging processing, voice and object recognition or natural language processing. Convolution Neural Networks (CNNs) and Deep Belief Networks (DBNs) are just a few examples of computation paradigms that employ ANN algorithms.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
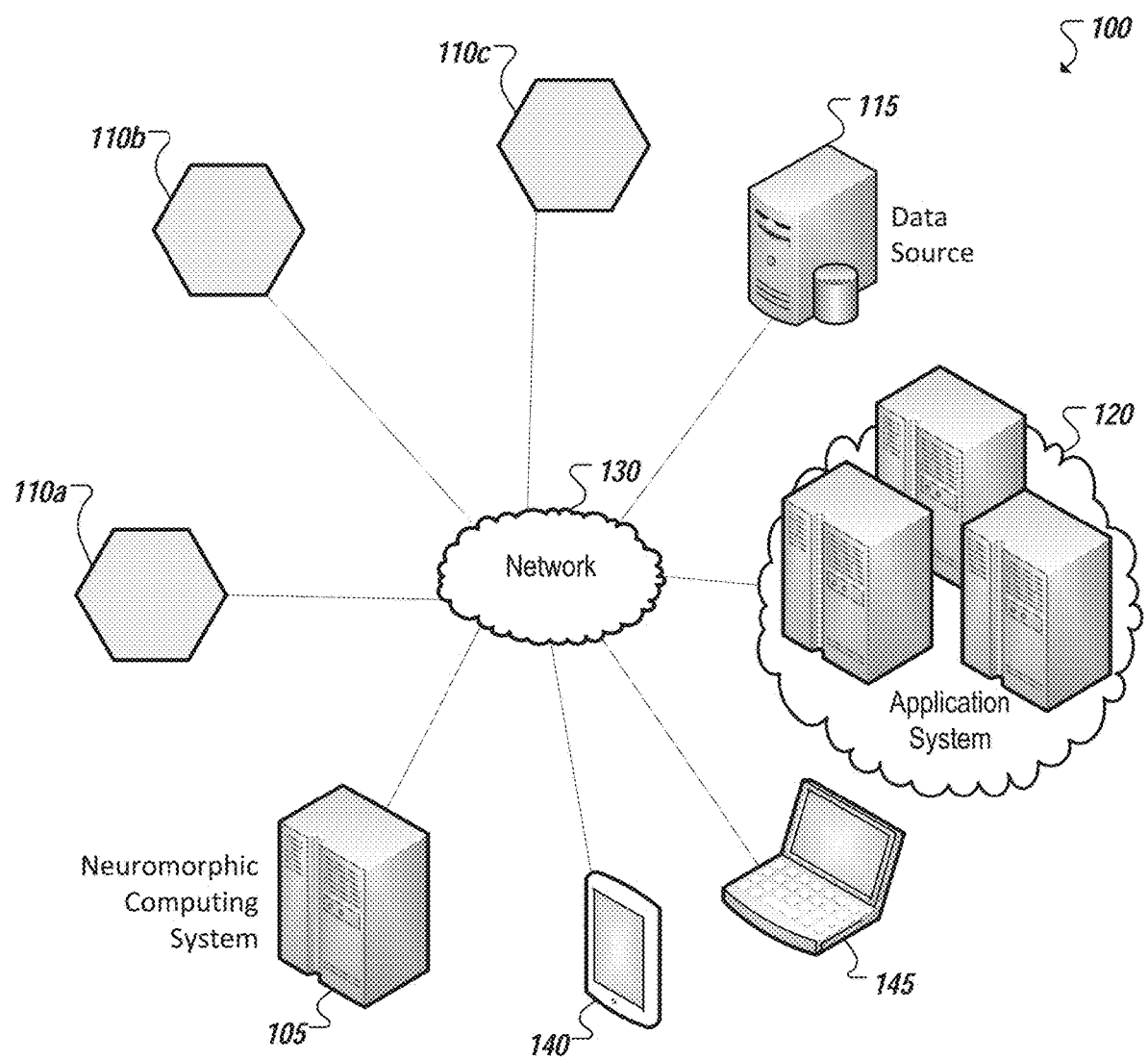
FIG. 1 illustrates an embodiment of a system including a neuromorphic computing systems.

FIG. 1 illustrates an example computing system including a neuromorphic computing system 105, which may accept as inputs, data from one or a variety of sources. For instance, sources may include sensor devices (e.g., 110a-c). Such devices 110a-c may detect and/or measure attributes of an environment and generate sensor data describing or capturing characteristics of the environment. For instance, a given sensor may be configured to detect such characteristics as movement, weight, physical contact, temperature, wind, noise, light, computer communications, wireless signals, humidity, the presence of radiation or specific chemical compounds, among several other examples. Sensors may generate numerical data describing these attributes, audio data, photographic images, video, among other sensor data. Sources may additionally include data stores, such as databases of one or more computing systems (e.g., 115), which may aggregate data and/or generate additional data (e.g., from post processing of the aggregated data), such as in connection with a governmental, enterprise, scientific, or other entity or project. Data from the one or more sources (e.g., 110a-c, 115, etc.) may be provided to the neuromorphic computing system 105 to perform machine and deep learning on the information encapsulated in the data. Results of produced by the neuromorphic computing system 105 may be additionally consumed, for instance, by an application system 120 hosting one or more other processes, programs, or applications. User endpoint devices (e.g., 140, 145), such as personal computers and mobile devices, may additionally make use of the results generated from or in connection with a neuromorphic computing system 105, such as through the consumption of the results by one or more applications hosted by the user devices (e.g., 140, 145), presenting the results on a graphical user interface of the user device, among other examples.

In some instances, as implied by the example illustrated in FIG. 1, a neuromorphic computing system 105 may be provided as a service (e.g., over a network 130) to one or more other systems (e.g., 120, 140, 145). A neuromorphic computing system 105 may additionally utilize inputs generated by remote systems (e.g., an Internet of Things (IoT) network composed of multiple sensor devices (e.g., 110a-c). In other instances, the functionality of a neuromorphic computing system 105 may be integrated with any one of the other example systems (e.g., 110a-c, 115, 120, 130, 140, 145, etc.). For instance, a wearable device or IoT device (e.g., 110a-c) may be provided with neuromorphic computing resources to operate directly on inputs generated by a sensor of the device. As another example, an application or service may be provided (e.g., by application server system 120), which includes and makes use of neuromorphic computing resources, among a variety of other examples and use cases.

Further, neuromorphic computing systems may utilized to support or implement products or services based on or utilizing artificial intelligence, including digital personal assistants, chatbots, video games, self-driving cars, robots, and other examples. In general, "servers," "clients," "computing devices," "network elements," "hosts," "system-type system entities," "user devices," "sensor devices," and "systems" (e.g., 105, 110a-c, 115, 120, 130, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Neuromorphic computing may involve the use of very-large-scale integration (VLSI) systems containing electronic circuits to mimic neuro-biological architectures present in the nervous system to imbue computing systems with "intelligence". A desirable feature of neuromorphic computing is its ability to autonomously extract high dimensional spatiotemporal features from raw data streams that can reveal the underlying physics of the system being studied thus making them amenable for rapid recognition. Such features may be useful in big data and other large scale computing problems.

Traditional approaches to solving large scale computing problems have relied on experts to extract critical features from the data based on their domain knowledge. Until recently the common approach to address this sort of a problem has been to rely on expert features, these features were then fed to shallow machine learning classifiers such as boosted decision trees for classification. However, due to the high dimensional nature of the data and the absence of any complete analytical model for classification directly from theoretical principles, sometimes that these expert designed features do not capture all of the available information. Moreover, in many cases, there is a lack of sufficient domain knowledge to even attempt such approaches. To address this issue, some solutions have deployed deep machine learning algorithms to directly classify from high dimensional data using low-level features to obviate the need for any domain knowledge. With availability of large amounts of training data as ground truth, as well as with the advent of large scale computing systems with extensive memory and compute power, these algorithms have become a valuable tool for classification and pattern recognition tasks for big data and large scale systems. Such "neurally-inspired" algorithms may be characterized by hierarchical and feedforward organization where the artificial neurons or processing units in lower levels of the hierarchy have small receptive fields that serve as input filters sensitive to low level features. The outputs of these filters may be then fed to the next level, pooling information across several previous level filters. This process is repeated until a classifier is trained to detect objects of interest in the final layer. The salient aspect of such algorithms is that neuronal activity at increasingly higher levels abstracts more general and complex features. The pooling operation is beneficial for extracting features that are often transformation invariant, thus forming a stable internal representation. Such solutions may be successfully applied to challenging problems in machine learning including object recognition and other examples.

While deep learning models (e.g., feed forward neural networks utilizing nonlinear activation functions) may bear resemblance in architecture to their biological counterparts, they have failed to explain recognition in general owing to its inability to generalize well to novel situations with limited training examples. There are many issues with current deep machine learning approaches. For instance, low-level processing determines high-level processing and thus information loss in lower stages is irretrievable. As another example, pooling operations result in seeing wholes at the expense of the parts, as is evident in target-distractor recognition tasks, where both target and distractor features at the lower level are pooled at the higher levels. Such models require millions of examples in order to learn to "average" out distractors, while extracting the most reliable target features. The resulting representation is brittle because the distractor set is virtually infinite, and thus even after a large number of training examples a new distractor can still cause false alarms. Additionally, all units and parameters at all levels of the network are engaged in representing any given input, and are adjusted together during learning.

In some implementations, an improved neuromorphic computing platform may be provided which adopts an energy efficient architecture inspired by the brain that is both scalable and energy efficient while also supporting multiple modes of learning on-chip. Furthermore, such neuromorphic computing hardware may be connected to, integrated with, or otherwise used together with general computing hardware (e.g., a CPU) to support a wide range of traditional workloads as well as non-traditional workloads such as dynamic pattern learning and adaptation, constraint satisfaction and sparse coding using a single compute platform. Such a solution may leverage understandings from biological neuroscience regarding the improvement of system level performance by leveraging various learning modes such as unsupervised, supervised and reinforcement using spike timing and asynchronous computation, among other example features and considerations.

Figure 2A:
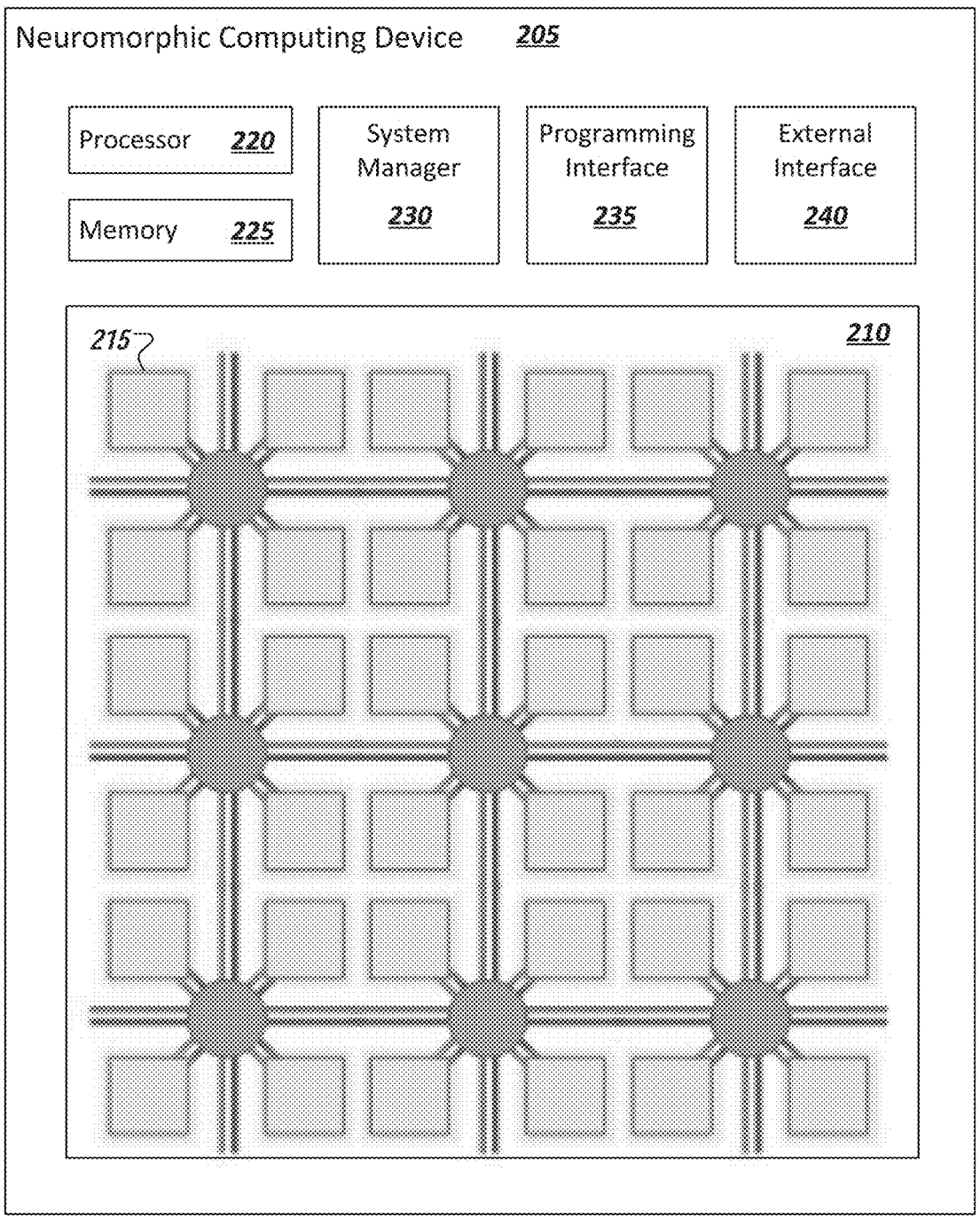
FIG. 2A illustrates a simplified block diagram of an example neuromorphic computing device utilizing a network of hardware-implemented neuromorphic cores.

In one implementation, a neuromorphic computing system is provided that adopts a multicore architecture where each core houses the computing elements including neurons, synapses with on-chip learning capability, and local memory to store synaptic weights and routing tables. FIG. 2A is a simplified block diagram 200 illustrating an example of at least a portion of such a neuromorphic computing device 205. As shown in this example, a device 205 may be provided with a network 210 of multiple neural network cores interconnected by an on-device network such that multiple different connections may be potentially defined between the cores. For instance, a network 210 of spiking neural network cores may be provided in the device 205 and may each communicate via short packetized spike messages sent from core to core over the network channels. Each core (e.g., 215) may possess processing and memory resources and logic to implement some number of primitive nonlinear temporal computing elements, such as multiple (e.g., 1000+)

distinct artificial neurons (referred to herein as "neurons"). For instance, each core may be capable of concurrently implementing multiple neurons such that the collection of neuromorphic cores may implement many multiples of neurons using the device.

Continuing with the example of FIG. 2A, a neuromorphic computing device 205 may additionally include a processor 220 and system memory 225 to implement one or more components to manage and provide functionality of the device. For instance, a system manager 230 may be provided to manage global attributes and operations of the device (e.g., attributes affecting the network of cores 210, multiple cores in the network, interconnections of the device 205 with other devices, manage access to global system memory 225, among other potential examples). In one example, a system manager 230 may manage the definition and provisioning of a specific routing tables to the various routers in the network 210, orchestration of a network definition and attributes (e.g., weights, decay rates, etc.) to be applied in the network, core synchronization and time multiplexing management, routing of inputs to the appropriate cores, among other potential functions.

As another example, a neuromorphic computing device 205 may additionally include a programming interface 235 through which a user or system may specify a neural network definition to be applied (e.g., through a routing table and individual neuron properties) and implemented by the mesh 210 of neuromorphic cores. A software-based programming tool may be provided with or separate from the neuromorphic computing device 205 through which a user may provide a definition for a particular neural network to be implemented using the network 210 of neuromorphic cores. The programming interface 235 may take the input of the programmer to then generate corresponding routing tables and populate local memory of individual neuromorphic cores (e.g., 215) with the specified parameters to implement a corresponding, customized network of artificial neurons implemented by the neuromorphic cores.

In some cases, a neuromorphic computing device 205 may advantageously interface with and interoperate with other devices, including general purpose computing devices, to realize certain applications and use cases. Accordingly, external interface logic 240 may be provided in some cases to communicate (e.g., over one or more defined communication protocols) with one or more other devices. An external interface 240 may be utilized to accept input data from another device or external memory controller acting as the source of the input data. An external interface 240 may be additionally or alternatively utilized to allow results or output of computations of a neural network implemented using the neuromorphic computing device 205 to be provided to another device (e.g., another general purpose processor implementing a machine learning algorithm) to realize additional applications and enhancements, among other examples.

Figure 2B:
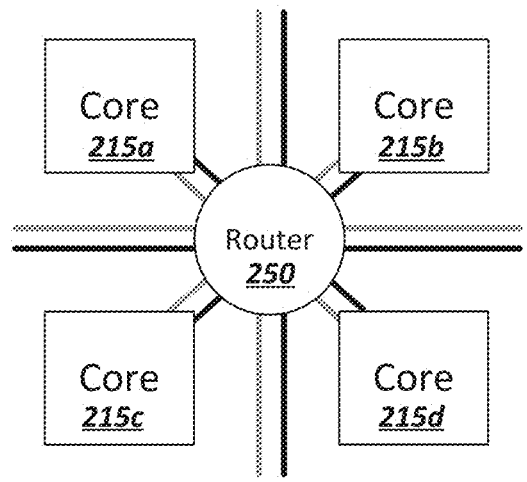
FIG. 2B illustrates a simplified block diagram illustrating a portion of a network of neuromorphic cores interconnected by one or more routers.

As shown in FIG. 2B, a block diagram 200b is shown illustrating a portion of a network fabric interconnecting multiple neuromorphic cores (e.g., 215a-d). For instance, a number of neuromorphic cores (e.g., 215a-d) may be provided in a mesh, with each core being interconnected by a network including a number of routers (e.g., 250). In one implementation, each neuromorphic core (e.g., 215a-d) may be connected to a single one of the routers (e.g., 250) and each of the routers may be connected to at least one other router (as shown at 210 in FIG. 2A). As an example, in one particular implementation, four neuromorphic cores (e.g., 215a-d) may be connected to a single router (e.g., 250) and each of the routers may be connected to two or more other routers to form a manycore mesh, allowing each of the neuromorphic cores to interconnect with each other neuromorphic core in the device. Moreover, as each neuromorphic core may be configured to implement multiple distinct neurons, the router network of the device may similarly enable connections, or artificial synapses (or, simply, "synapses"), to be defined between any two of the potentially many (e.g., 30,000+) neurons defined using the network of neuromorphic cores provided in a neuromorphic computing device.

Figure 2C:
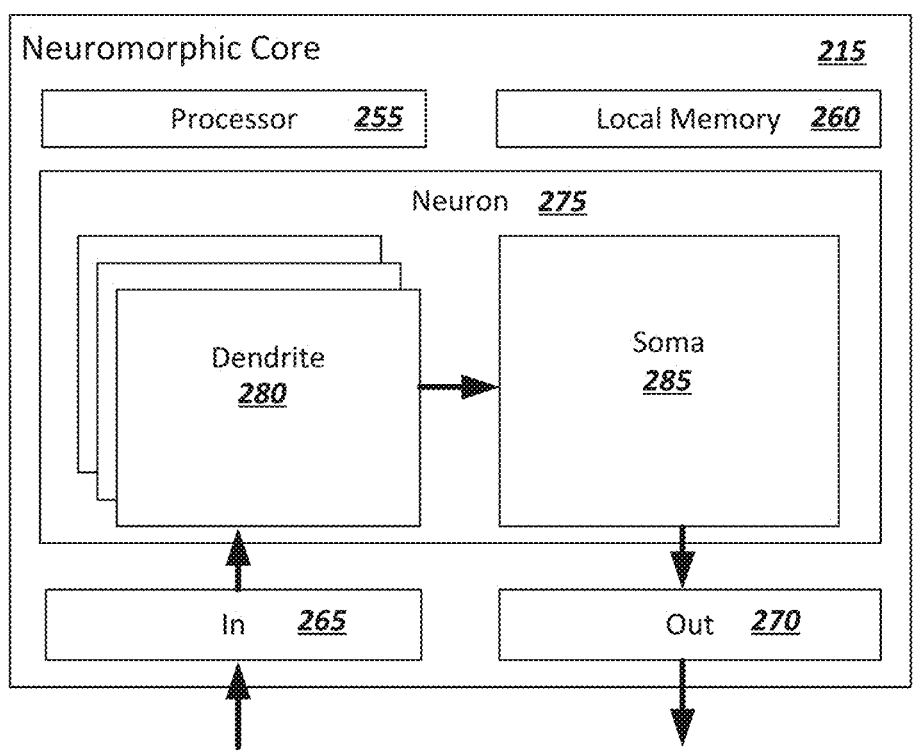
FIG. 2C illustrates a simplified block diagram of an example one of the number of neuromorphic cores implemented in an example neuromorphic computing device.

FIG. 2C shows a block diagram 200c illustrating internal components of one example implementation of a neuromorphic core 215. In one example, a single neuromorphic core may implement some number of neurons (e.g. 1024) that share architectural resources of the neuromorphic core in a time-multiplexed manner. In one example, each neuromorphic core 215 may include a processor block 255 capable of performing arithmetic functions and routing in connection with the realization of a digitally implemented artificial neuron, such as explained herein. Each neuromorphic core 215 may additionally provide local memory in which a routing table may be stored and accessed for a neural network, accumulated potential of each soma of each neuron implemented using the core may be tracked, parameters of each neuron implemented by the core may be recorded, among other data and usage. Components, or architectural resources, of a neuromorphic core 215 may further include an input interface 265 to accept input spike messages generated by other neurons on other neuromorphic cores and an output interface 270 to send spike messages to other neuromorphic cores over the mesh network. In some instances, routing logic for the neuromorphic core 215 may be at least partially implemented using the output interface 270. Further, in some cases, a core (e.g., 215) may implement multiple neurons within an example SNN and some of these neurons may be interconnected. In such instances, spike messages sent between the neurons hosted on the particular core may forego communication over the routing fabric of the neuromorphic computing device and may instead by managed locally at the particular neuromorphic core.

Each neuromorphic core may additionally include logic to implement, for each neuron 275, an artificial dendrite 280 and an artificial soma 185 (referred to herein, simply, as "dendrite" and "soma" respectively). The dendrite 280 may be a hardware-implemented process that receives spikes from the network. The soma 285 may be a hardware-implemented process that receives each dendrite's accumulated neurotransmitter amounts for the current time and evolves each dendrite and soma's potential state to generate outgoing spike messages at the appropriate times. A dendrite 280 may be defined for each connection receiving inputs from another source (e.g., another neuron). In one implementation, the dendrite process 280 may receive and handle spike messages as they serially arrive in time-multiplexed fashion from the network. As spikes are received, the neuron's activation (tracked using the soma 285 (and local memory 260)) may increase. When the neuron's activation exceeds a threshold set for the neuron 275, the neuron may generate a spike message that is propagated to a fixed set of fanout neurons via the output interface 270. The network distributes the spike messages to all destination neurons, and in response those neurons, in turn, may update their activations in a transient, time-dependent manner, and so on, potentially causing the activation of some of these destination neurons to also surpass corresponding thresholds and trigger further spike messages, as in real biological neural networks.

As noted above, a neuromorphic computing device may reliably implement a spike-based model of neural computation. Such models may also be referred to as Spiking Neural Networks (SNNs). In addition to neuronal and synaptic state, SNNs also incorporate the concept of time. For instance, in an SNN, communication occurs over event-driven action potentials, or spikes, that convey no explicit information other than the spike time as well as an implicit source and destination neuron pair corresponding to the transmission of the spike. Computation occurs in each neuron as a result of the dynamic, nonlinear integration of weighted spike input. In some implementations, recurrence and dynamic feedback may be incorporated within an SNN computational model. Further, a variety of network connectivity models may be adopted to model various real world networks or relationships, including fully connected (all-to-all) networks, feed-forward trees, fully random projections, "small world" networks, among other examples. A homogeneous, two-dimensional network of neuromorphic cores, such as shown in the example of FIGS. 2A-C may advantageously supports all of these network models. As all cores of the device are connected, all neurons defined in the cores are therefore also fully connected through some number of router hops. The device may further include fully configurable routing tables to define a variety of different neural networks by allowing each core's neurons to distribute their spikes to any number of cores in the mesh to realize fully arbitrary connectivity graphs.

In an improved implementation of a system capable of supporting SNNs, such as the very large scale integration (VLSI) hardware device illustrated in the example of FIGS. 2A-C, high speed and reliable circuits may be provided to implement SNNs to model the information processing algorithms as employed by the brain, but in a more programmable manner. For instance, while a biological brain can only implement a specific set of defined behaviors, as conditioned by years of development, a neuromorphic processor device may provide the capability to rapidly reprogram all neural parameters. Accordingly, a single neuromorphic processor may be utilized to realize a broader range of behaviors than those provided by a single slice of biological brain tissue. This distinction may be realized by adopting a neuromorphic processor with neuromorphic design realizations that differ markedly from those of the neural circuits found in nature.

As an example, a neuromorphic processor may utilize time-multiplexed computation in both the spike communication network and the neuron machinery of the device to implement SNNs. Accordingly, the same physical circuitry of the processor device may be shared among many neurons to realize higher neuron density. With time multiplexing, the network can connect N cores with O(N) total wiring length, whereas discrete point-to-point wiring would scale as $O(N^2)$, realizing a significant reduction in wiring resources to accommodate planar and non-plastic VLSI wiring technologies, among other examples. In the neuromorphic cores, time multiplexing may be implemented through dense memory allocation, for instance, using Static Random Access Memory (SRAM), with shared buses, address decoding logic, and other multiplexed logic elements. State of each neuron may be stored in the processor's memory, with data describing each neuron state including state of each neuron's collective synapses, all currents and voltages over its membrane, among other example information (such as configuration and other information).

In one example implementation, a neuromorphic processor may adopt a "digital" implementation that diverts from other processors adopting more "analog" or "isomorphic" neuromorphic approaches. For instance, a digital implementation may implement the integration of synaptic current using digital adder and multiplier circuits, as opposed to the analog isomorphic neuromorphic approaches that accumulate charge on capacitors in an electrically analogous manner to how neurons accumulate synaptic charge on their lipid membranes. The accumulated synaptic charge may be stored, for instance, for each neuron in local memory of the corresponding core. Further, at the architectural level of an example digital neuromorphic processor, reliable and deterministic operation may be realized by synchronizing time across the network of cores such that any two executions of the design, given the same initial conditions and configuration, will produce identical results. Asynchrony may be preserved at the circuit level to allow individual cores to operate as fast and freely as possible, while maintaining determinism at the system level. Accordingly, the notion of time as a temporal variable may be abstracted away in the neural computations, separating it from the "wall clock" time that the hardware utilized to perform the computation. Accordingly, in some implementation, a time synchronization mechanism may be provided that globally synchronizes the neuromorphic cores at discrete time intervals. The synchronization mechanism allows the system to complete a neural computation as fast as the circuitry allows, with a divergence between run time and the biological time that the neuromorphic system models.

In operation, the neuromorphic mesh device may begin in an idle state with all neuromorphic cores inactive. As each core asynchronously cycles through its neurons, it generates spike messages that the mesh interconnect routes to the appropriate destination cores containing all destination neurons. As the implementation of multiple neurons on a single neuromorphic core may be time-multiplexed, a time step may be defined in which all spikes involving the multiple neurons may be processed and considered using the shared resources of a corresponding core. As each core finishes servicing its neurons for a respective time step, the cores may, in some implementations, communicate (e.g., using a handshake) with neighboring cores using synchronization messages to flush the mesh of all spike messages in flight, allowing the cores to safely determine that all spikes have been serviced for the time step. At that point all cores may be considered synchronized, allowing them to advance their time step and return to the initial state and begin the next time step.

Given this context, and as introduced above, a device (e.g., 205) implementing a mesh 210 of interconnected neuromorphic cores may be provided, with the core implementing potentially multiple artificial neurons capable of being interconnected to implement an SNN. Each neuromorphic core (e.g., 215) may provide two loosely coupled asynchronous processes: an input dendrite process (e.g., 280) that receives spikes from the network and applies them to the appropriate destination dendrite compartments at the appropriate future times, and an output soma process (e.g., 285) that receives each dendrite compartment's accumulated neurotransmitter amounts for the current time and evolves each dendrite and soma's membrane potential state, generating outgoing spike messages at the appropriate times (e.g., when a threshold potential of the soma has been reached). Note that, from a biological perspective, the dendrite and soma names used here only approximate the role of these functions and should not be interpreted too literally.

Spike messages may identify a particular distribution set of dendrites within the core. Each element of the distribution set may represent a synapse of the modeled neuron, defined by a dendrite number, a connection strength (e.g., weight W), a delay offset D, and a synapse type, among potentially other attributes. In some instances, each weight $W_i$ may be added to the destination dendrite's total current u scheduled for servicing at time step $T+D_i$ in the future. While not handling input spikes, the dendrite process may serially service all dendrites sequentially, passing the total current u for time T to the soma stage. The soma process, at each time step, receives an accumulation of the total current u received via synapses mapped to specific dendritic compartments of the soma. In the simplest case, each dendritic compartment maps to a single neuron soma. In other instances, a neuromorphic core mesh architecture may additionally support multi-compartment neuron models. Core memory may store the configured attributes of the soma and the state of the soma, the total accumulated potential at the soma, etc. In some instances, synaptic input responses may be modeled in the core with single-time-step current impulses, low state variable resolution with linear decay, and zero-time axon delays, among other example features. In some instances, neuron models of the core may be more complex and implement higher resolution state variables with exponential decay, multiple resting potentials per ion channel type, additional neuron state variables for richer spiking dynamics, dynamic thresholds implementing homeostasis effects, and multiple output spike timer state for accurate burst modeling and large axonal delays, among other example features. In one example, the soma process implemented by each of the neuromorphic cores may implement a simple current-based Leaky Integrate-and-Fire (LIF) neuron model.

Figure 3A:
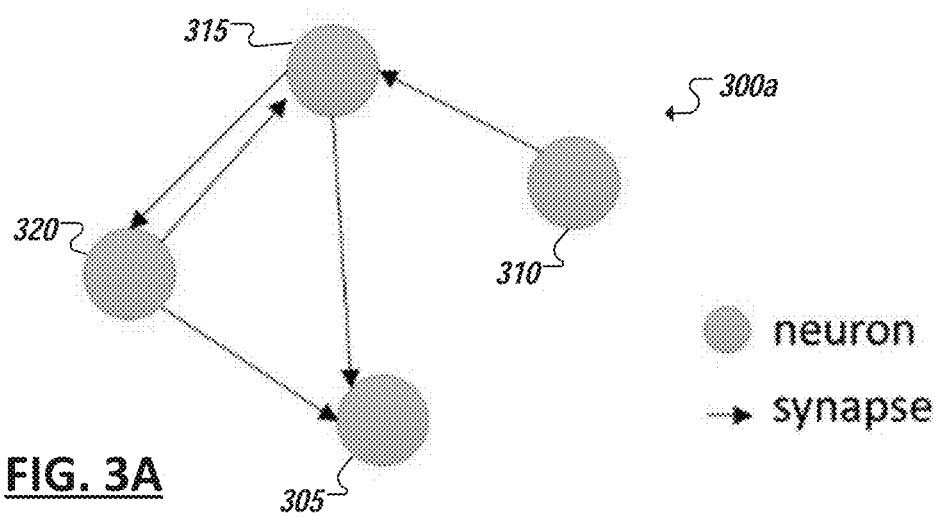
FIGS. 3A-3B are simplified block diagrams of portions of example neural networks capable of being implemented using an example neuromorphic computing device.

A neuromorphic computing device, such as introduced in the examples above, may be provided to define a spiking neural network architecture abstraction that can efficiently solve a class of sparse coding problems. As noted above, the basic computation units in the architecture may be neurons and the neurons may be connected by synapses, which define the topology of the neural network. Synapses are directional, and neurons are able to communicate to each other if a synapse exists. FIG. 3A is a simplified block diagram 300a illustrating a simple example neural network, including neurons 305, 310, 315, 320 connected by synapses. The synapses allow spike messages to be transmitted between the neurons. For instance, neuron 305 may receive spike messages generated by neurons 315, 320. As neuron 305 receives spike messages from the other neurons it is connected to, the potential of the neuron 305 may exceed a threshold defined for the neuron 305 (e.g., defined in its soma process) to cause the neuron 305 itself to generate and transmit a spike message. As noted, synapses may be directional. In some cases, a network and corresponding synapses may be defined such that a neuron (e.g., 315) only receives or transmits to some of the other neuron (e.g., 305), while in synapses may be defined which connect the neuron bi-directionally with other neurons (e.g., between neurons 315, 320) to create a feedback loop, among other examples.

An example neuromorphic computing device may adopt leaky integrate-and-fire neurons and current-based synapses. Accordingly, the dynamics of the network may be driven by the evolution of the state variables in each neuron. In one example, each neuron has two types of state variables: one membrane potential v(t), and one or more dendritic current(s) $u^1(t), \ldots$ to $u^s(t)$. An individual neuron's dynamics may be defined by the following continuous-time differential equations (1)-(3).

$$\frac{du^k(t)}{dt} = \frac{-1}{\tau_s^k} u^k(t), k = 1, 2, \ldots, s \quad (1)$$

$$\frac{dv(t)}{dt} = \frac{-1}{\tau_m} v(t) + \sum_{k=1}^{s} u^k(t) + I^{bias} \quad (2)$$

$$\text{if } v(t^-) \geq \theta, \text{ Spike, and } v(t^+) = 0 \quad (3)$$

Equation (1) depicts the dynamics of dendritic current. Each dendritic current variable may be defined to decay exponentially over time, according to its respective decay time constant $\tau_s^k$. The dendritic current may be linearly summed to control the integration of the membrane potential (as shown in Equation (2)). Similar to dendritic current, the membrane potential may also be subject to exponential decay with a separate membrane potential time constant $\tau_m$. Equation (3) may define the spiking event of a neuron. When a neuron's membrane potential reaches a particular threshold voltage θ defined for the neuron, the neuron (e.g., through its soma process) resets the membrane potential to zero, and sends out a spike to neighboring neurons connected by corresponding synapses. The dendrite process of each neuron can be defined such that a spike arrival causes a change in the dendritic current. Such interactions between neurons lead to the complex dynamics of the network. Spikes are transmitted along synapses and the incoming synapse may be defined to be associated with one dendritic current variable, e.g., using the dendritic compartment. In such implementations, each spike arrival changes only one dendritic current $u^k(t)$. The change may be defined to manifest as an instantaneous jump in $u^k(t)$, such as defined in Equation (4), based on the magnitude of the synaptic weight $w_{ij}$.

$$u^k(t^+) = u^k(t^-) + w_{ij} \quad (4)$$

Accordingly, in some implementations, in addition to the state variables of a neuron, there are several other configurable parameters, including the time constant of individual dendritic compartment $\tau_s^1, \ldots, \tau_s^s$, a single $\tau_m$, θ, $I^{bias}$ for each neuron, and a configurable weight value $w_{ij}$ for each synapse from neuron j to i, which may be defined and configured to model particular networks.

Figure 3B:
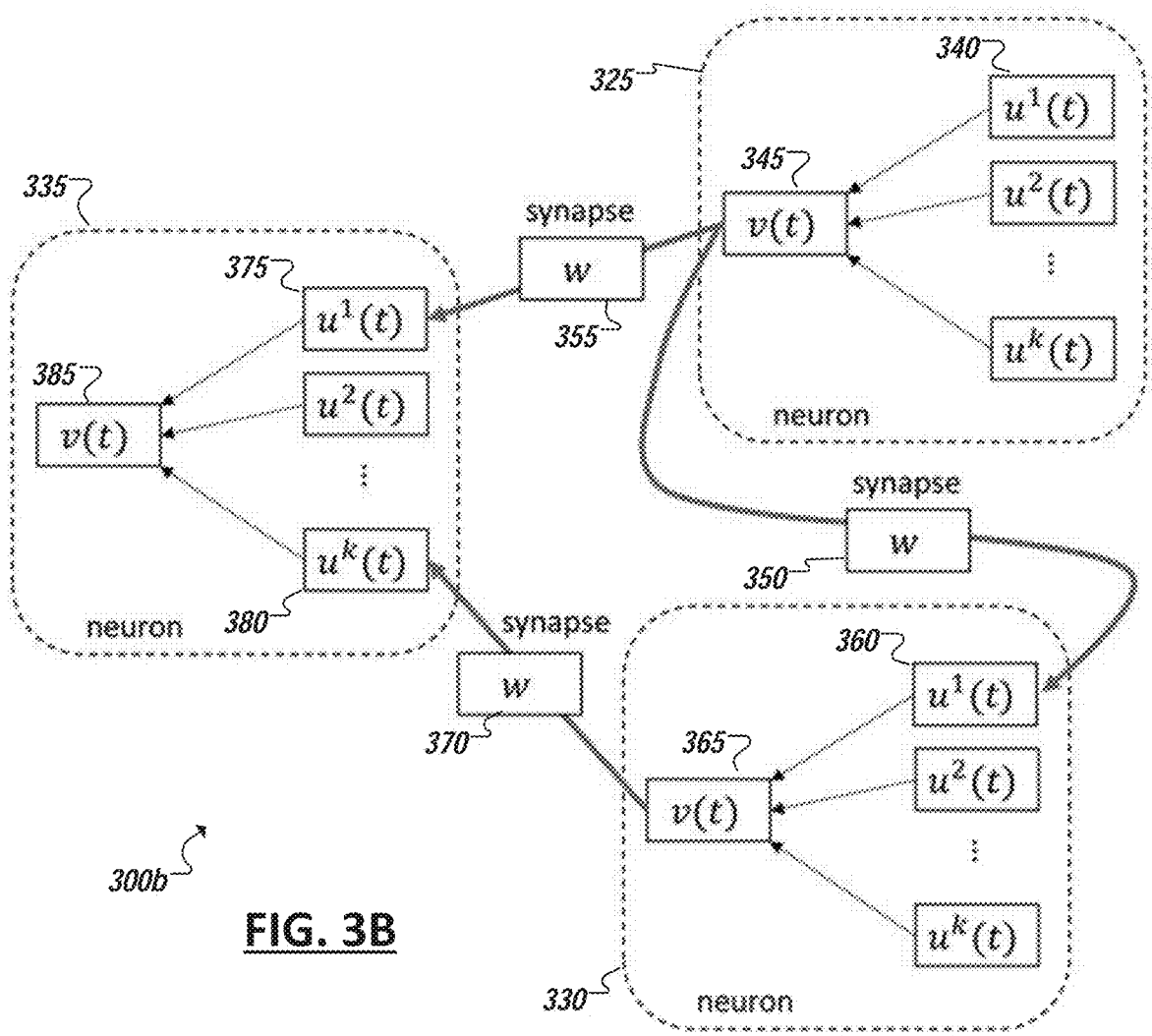

For instance, FIG. 3B shows an example illustrating synaptic connections between individual dendrites of neurons in a network, and the parameters that may be defined for these neurons and synapses. As an example, in FIG. 3B, neurons 325, 330, 335 implemented by cores of an example neuromorphic computing device are shown, together with synapses defined (e.g., using a routing table) for interconnections within a neural network implemented using the neurons 325, 330, 335. Each neuron may include one or more dendrite (processes) (e.g., 340, 360, 375, 380) and a respective soma (process) (e.g., 345, 365, 385). Spike messages received at each of the dendrites of a respective neuron may contribute to the activation potential of the soma, with the soma firing a spike message when the soma-specific potential threshold is reached. A synapse connects two neurons. The synapse may effectively connect the soma of a sending neuron to one of the dendrites of the receiving neuron. Further, each synapse may be assigned a respective weight (e.g., 350, 355, 370). In the example of FIG. 3B, a synapse with a first weight 350 may connect soma 345 of neuron 325 with dendrite 360 of neuron 330. Soma 345 of neuron 325 may additionally connect to neuron 380 via another synapse (with potentially a different weight 355). Soma 365 of neuron 330 may also connect to neuron 380 via a respective synapse 370. In some cases, multiple neurons may connect to a particular neuron at the same dendrite of the particular neuron. In such instances, the parameters defined for this one dendrite will govern the effect of the incoming spike messages from each of the connected neurons. In other cases, such as shown in FIG. 3B, different neurons (e.g., 325, 330) may connect to the same neuron (e.g., 335) but at different dendrites (e.g., 375 and 380 respectively), allowing different parameters (defined for each of these dendrites (e.g., 375, 380)) to affect the respective spikes arriving from each of these different neurons (e.g., 325, 330). Likewise, parameters may be defined for each of the somas (e.g., 345, 365, 385) of each of the various neurons (e.g., 325, 330, 335) defined in the network, allowing these parameters to likewise contribute to the overall configurability of the neural network implemented using the neuromorphic computing device, among other examples.

As a summary, neuron parameters may include such examples as a synaptic decay time constant $\tau_s$, bias current $I_b$, firing potential threshold $\theta$, and synaptic weight $w_{ij}$ from neuron to neuron (i.e., from neuron j to neuron i). These parameters may be set by a programmer of the neural network, for instance, to configure the network to model a real network, matrix, or other entity. Further, neuron state variables may be defined to include time-varying current u(t) and voltage v(t) and represented by corresponding ordinary differential equations.

As noted above, Equations (1)-(4) defines spiking neural network dynamics in continuous time. In a digital neuromorphic computing device, a network of neuromorphic cores is provided (such as shown and discussed in connection with FIGS. 2A-2C), with each of the neuromorphic cores possessing processor resources and logic executable to solve the continuous network dynamics using first-order techniques, such as by approximating SNN dynamics using discrete time steps. In one example, a virtual global clock is provided in the neuromorphic computing device to coordinate the time-stepped updates of individual neurons at each core. Within a time step, every neuron implemented by the network of cores can adjust (e.g., in a time-multiplexed manner) its respective state variables, and will do so no more than once per time step. Further, each spike message generated by a neuron in the SNN may be guaranteed to be delivered within a corresponding time step. Such a digital approximation may be realized as follows. Given the values of state variables at time $t_1$, the state variable values at $t_2$ after a fixed time interval $\Delta t$, $t_2 = t_1 + \Delta t$, can be obtained using Equations (5)-(8):

$$u^k(t_2^-) = u^k(t_1)e^{\frac{-\Delta t}{\tau_s^k}}, k = 1, 2, \ldots, s \quad (5)$$

$$v(t_2^-) = v(t_1)e^{\frac{-\Delta t}{\tau_m}} + \sum_{k=1}^{s} \tau_s^k [u^k(t_1) - u^k(t_2^-)] + I^{bias}\Delta t \quad (6)$$

$$\begin{cases} \text{if } v(t_2^-) \geq \theta, & \text{Spike, and } v(t_2) = 0 \\ \text{otherwise,} & v(t_2) = v(t_2^-) \end{cases} \quad (7)$$

$$u^k(t_2) = u^k(t_2^-) + \sum_j w_{ij}, \text{ for all spike arrivals to neuron } i \quad (8)$$

Figure 4A:
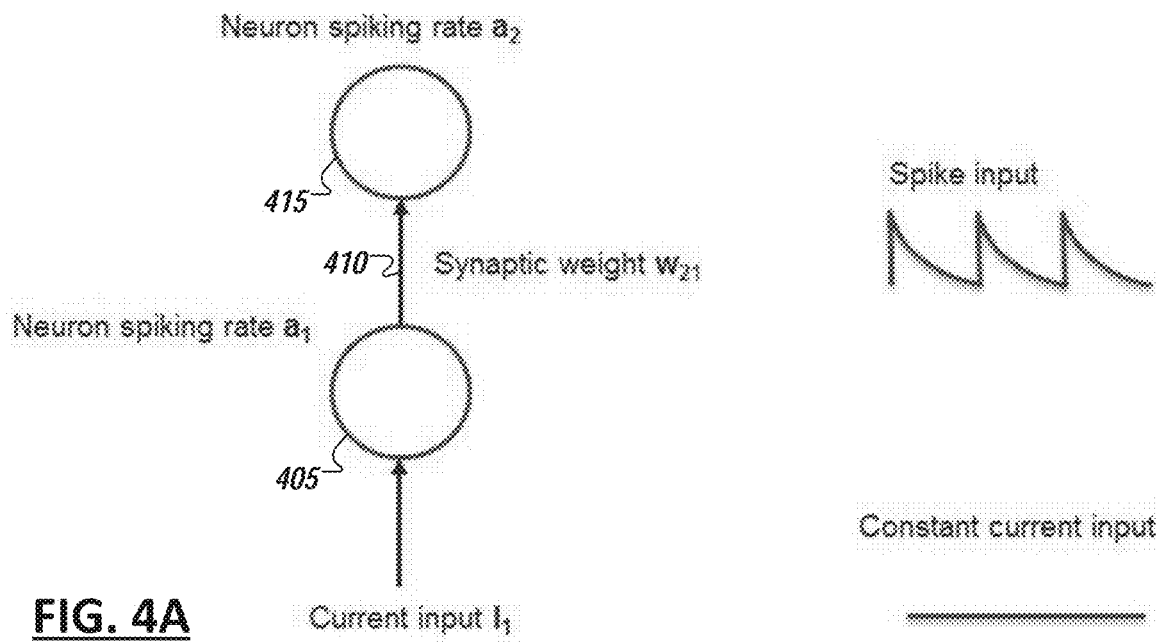
FIG. 4A is a simplified block diagram illustrating a portion of an example spiking neural network (SNN).
Figure 4B:
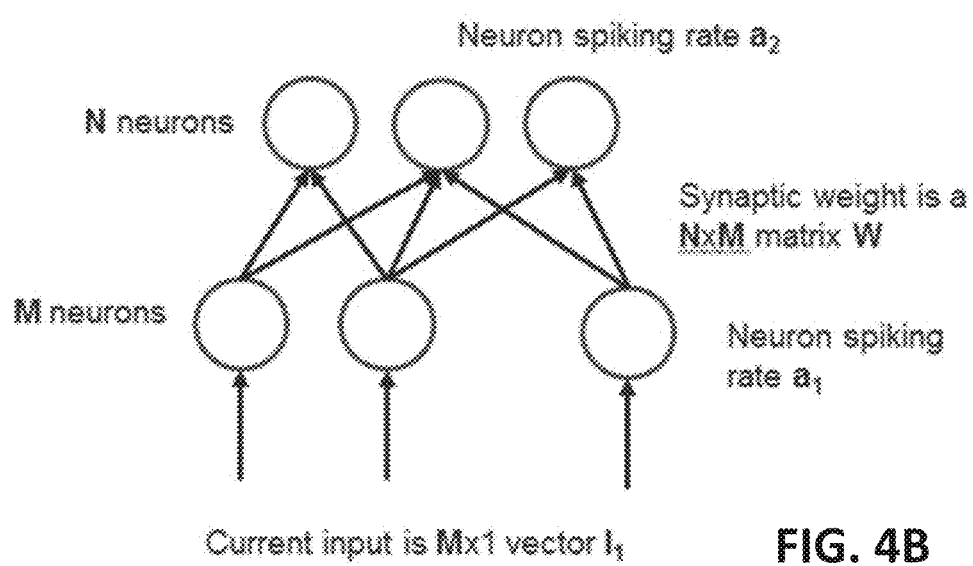
FIGS. 4B-4C are simplified block diagrams illustrating example simplified SNNs.
Figure 4C:
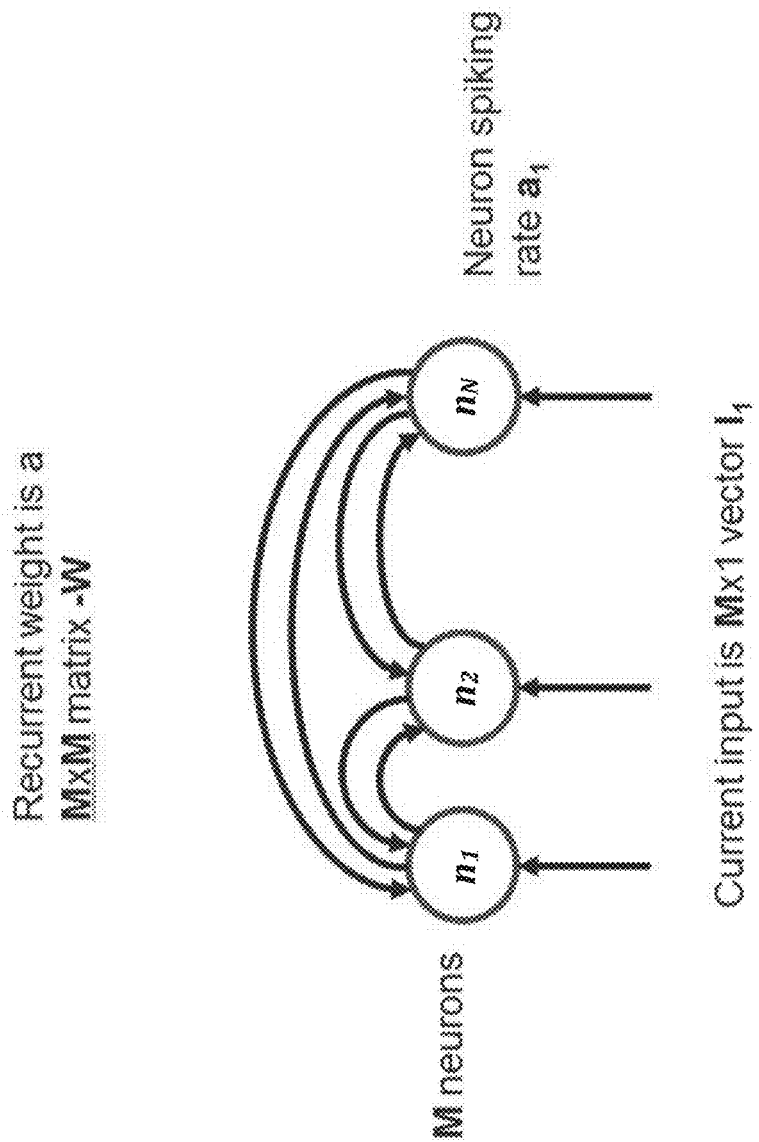

Turning to FIGS. 4A-4C, representations 400a-c are provided of interconnected artificial neurons within example spiking neural networks. As shown in FIG. 4A, an input current $I_1$ is provided to a first neuron 405, resulting in an increase in the potential of the neuron 405 until a threshold potential is reached and a spike message is generated by neuron 405. When a constant current input is applied at the first neuron, a predictable spike output at a fixed spiking rate $a_1$ (expressing the rate of spike messages generated over time) This spike message output (e.g., 410) may be then provided via one or more outbound synapses connecting the first neuron 405 to one or more other neurons (e.g., 415). A synaptic weight $w_{21}$ may be defined for the artificial synapse connecting the two neurons 405, 415. The second neuron 415 may receive the spike inputs 410 generated by the first neuron 405 causing spike messages to likewise be generated by the second neuron 405 when the internal membrane potential threshold of the second neuron is met, resulting a neuron spiking rate $a_2$ of the second neuron 415. The neuron dynamics of this simplified network shown in FIG. 4A may be expressed by linear arithmetic $$a_1 = I_1$$

$$a_2 = w_{21}a_1$$

Other attributes and parameters of individual neurons and synapses may be defined and influence the rate at which spikes are generated and the dynamics of the network. For instance, Parameter may be defined (e.g., via user or other programmatic inputs) to define parameters for each neuron in a network including a synaptic decay time constant ($\tau_s$), bias current ($I_b$), synaptic weight from neuron j to neuron i ($w_{ij}$), membrane firing threshold ($\theta$), among other examples. State of each neuron may be calculated and maintained (by corresponding neuromorphic cores implementing the neurons). Neuron state variables may be time varying and determined by the following ordinary differential equations u(t): current; v(t): voltage, where $\delta(t)$ represents the spiking messages, or input, received at the neuron:

$$\tau_s \frac{du}{dt} = -u + \sum w_{ij}\delta(t)$$

$$\frac{dv}{dt} = u + I_b$$

if $v(t) > \theta$, send spike and $v(t) \leftarrow 0$

The relationship between synaptic weight, input, and spiking rate may be leveraged to define SNNs to model numerical matrices and perform matrix arithmetic using the SNN. For instance, as shown in FIG. 4B, a collection of M neurons may be connected to another collection of N neurons, such that a unidirectional synaptic connection is defined from each one of the M neurons to each one of the N neurons, as illustrated in FIG. 4B. An input $I_1$ may be defined to be provided to the first layer of M neurons, such that the input defines an M×1 vector $I_1$. Respective synaptic weights $w_{nm}$ may be defined for each of the synapses connecting neurons in the first row to neurons in the second row, as in the example of FIG. 4B. The M×N number of synapses and corresponding weights may be represented as an N×M matrix W of the synaptic weights. Expanding on the foundation illustrated in FIG. 4B, the respective spiking rates $a_2$ of the top layer of neurons may be based on the spiking rates $a_1$ of the neurons in the first layer. An N×1 vector $a_2$ may express the collected spiking rates of the second (top) layer of neurons in the network, while an M×1 vector M×1 vector $a_1$ may express the collected spiking rates of the first (bottom) layer of neurons. Given the relationship between $a_1$ and $a_2$ the neuron dynamics of an SNN that interconnects a top and bottom layer of neurons may be used to represent the matrix-vector multiplication:

$$a_1 = I_1$$

$$a_2 = W a_1$$

Thus, $$a_2 = W I_1$$

Accordingly, the observed spiking rate of the top layer may represent the product of the inverse of the matrix W multiplied with vector $I_1$. By assigning synaptic weights to the SNN such that W corresponds to a numerical matrix with corresponding values and applying inputs to the SNN such that the inputs $I_1$ correspond to values of a numerical vector, the SNN can "perform" the matrix-vector multiplication of the numerical matrix and numerical vector based on proper programming of a SNN network (similar to the example shown in FIG. 4B). For instance, a programmable neuromorphic computing device may be programmed to define the M+N neurons and synapses connecting them with weights corresponding to the matrix to be multiplied by the SNN solver.

Turning to FIG. 4C, recurrent connections (and synapses) may be defined for an M×1 vector of artificial neurons in an SNN. A recurrently connected layer of neurons may be defined with respective synaptic weights represented by an M×M matrix $W^-$. An input provided to the M neurons may be represented as a vector $I_1$, which may produce spikes (fed recurrently to the neurons in the network) firing at respective spiking rates (represented by an M×1 vector $a_1$). Further, it should be appreciated that at steady state the input will be cancelled out by the product of W and $a_1$ such that: $I_1 - W a_1 = 0$, or $$a_1 = W^{-1} I_1$$

In other words, detecting a steady state manifesting in the spiking rates observed in a recurrently connected SNN may solve, or at least approximate, a matrix inverse problem involving the matrix W. Accordingly, as in the example of FIG. 4B, a configurable neuromorphic computing device may be programmed to implement a recurrently connected network of artificial neurons with synaptic weights corresponding to values of a matrix W and may be provided with a vector input with values corresponding to a vector $I_1$ to solve for the product of the inverse of the matrix W and the vector $I_1$, as illustrated in FIG. 4C.

Figure 5A:
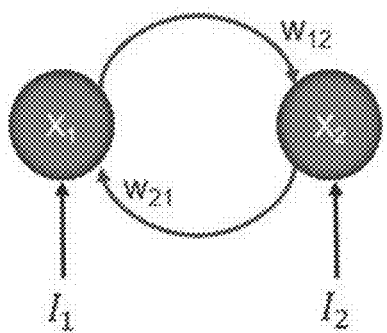
FIGS. 5A-5D are block diagrams illustrating principles corresponding to steady state conditions of various portions of examples SNNs.
Figure 5B:
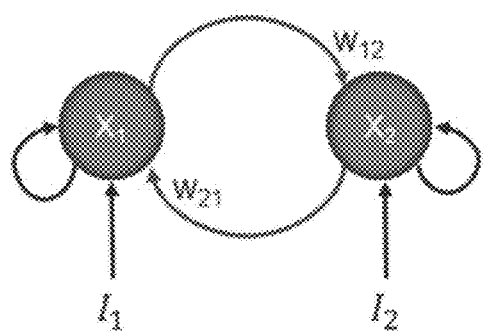
Figure 5C:
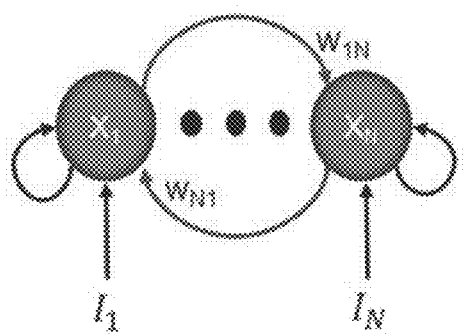
Figure 5D:
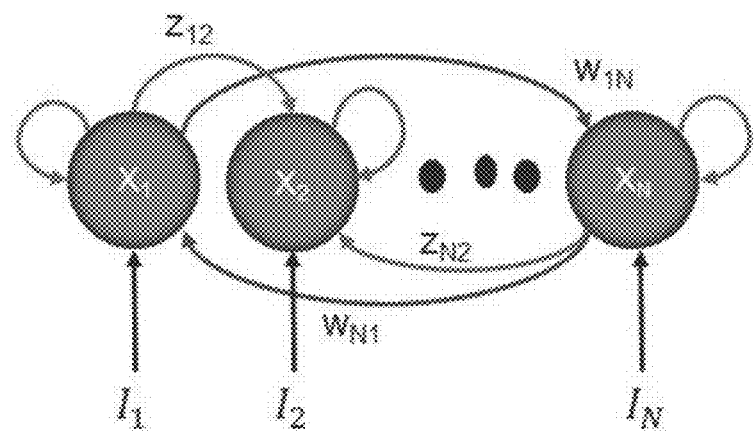

Turning to FIGS. 5A-5D, block diagrams 500a-d are shown illustrating the types of synaptic connections that may utilize by neural network designers to construct SNNs to model various matrix calculations including matrix inversions, matrix multiplication, and others. For instance, FIG. 5A illustrates a simple two-neuron case. The firing thresholds of the neurons may be configured as $\alpha_1$ and $\alpha_2$, and the inputs configured as $I_1$ and $I_2$. The two directional synapses connecting the two neurons have weights $w_{12}$ and $w_{21}$, with synaptic decay time constant $\epsilon_1$ and $\epsilon_2$. At steady state, the firing rates of the neurons $x_1$ and $x_2$ correspond to a solution of an inverse problem. FIG. 5B shows an extension of the example of FIG. 5A by adding synapses connecting a neuron to itself (i.e., recurrently), for which the steady state firing rate is still a solution of another inverse problem. FIG. 5B thereby shows an alternative to FIG. 5A for constructing a spiking neural network to solve an inverse problem. FIG. 5C shows that the example of FIG. 5B can be generalized to an arbitrary dimension of N neurons, solving an N×N inverse problem, with FIG. 5D showing further generalizations by adding inhibitory synapses between a pair of neurons, allowing more possible configurations to solve an inverse problem. The example of FIG. 5D provides an SNN configured (e.g., using a configurable digital neuromorphic computing architecture) to solve a matrix inversion problem. Such an SNN may be used to solve classes of matrix inversion problems (e.g., manifesting in various scientific computing applications) in an approximate fashion but with high throughput (using small $\epsilon$'s) and high energy efficiency (due to spike-based (i.e., sporadic) inter-node communication), among other example advantages.

Figure 6A:
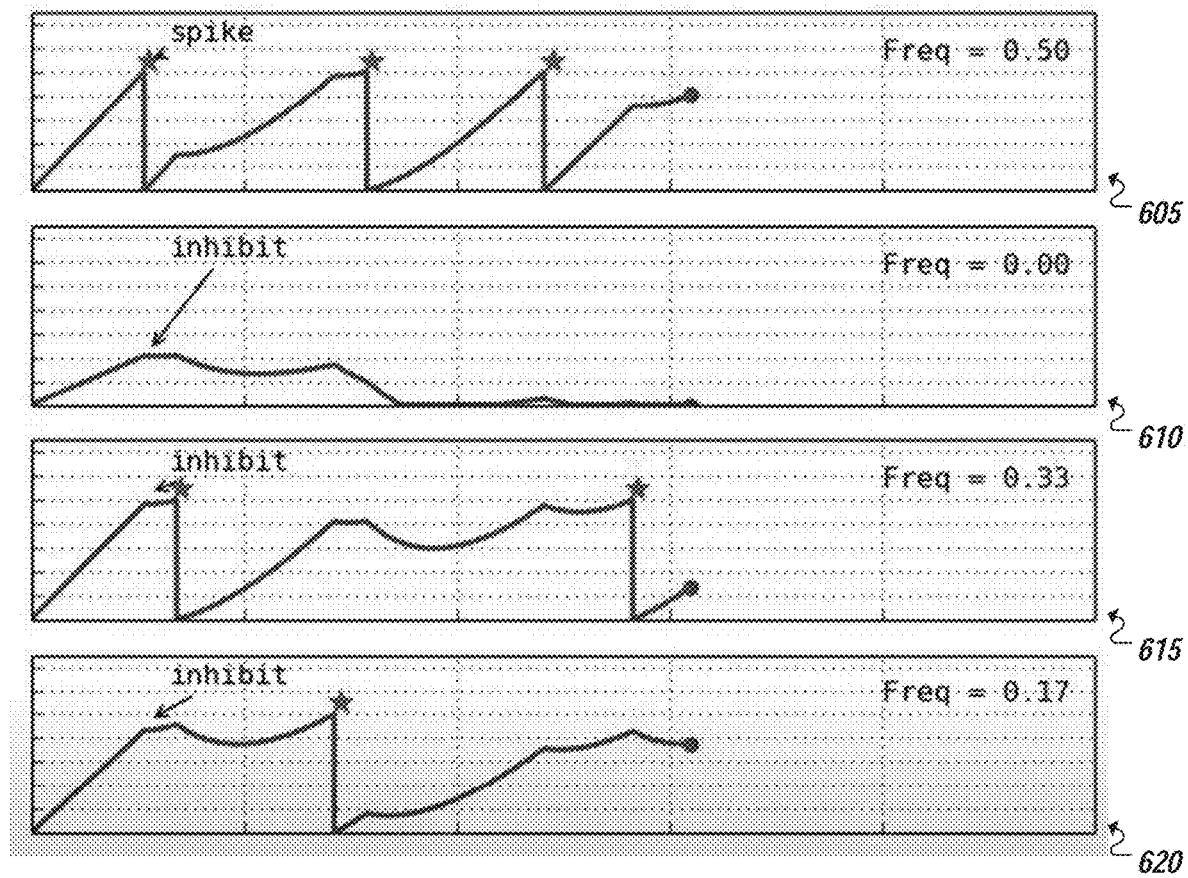
FIGS. 6A-6B are graphs illustrating spiking behavior and spike rates of example neurons with an example SNN.
Figure 6B:
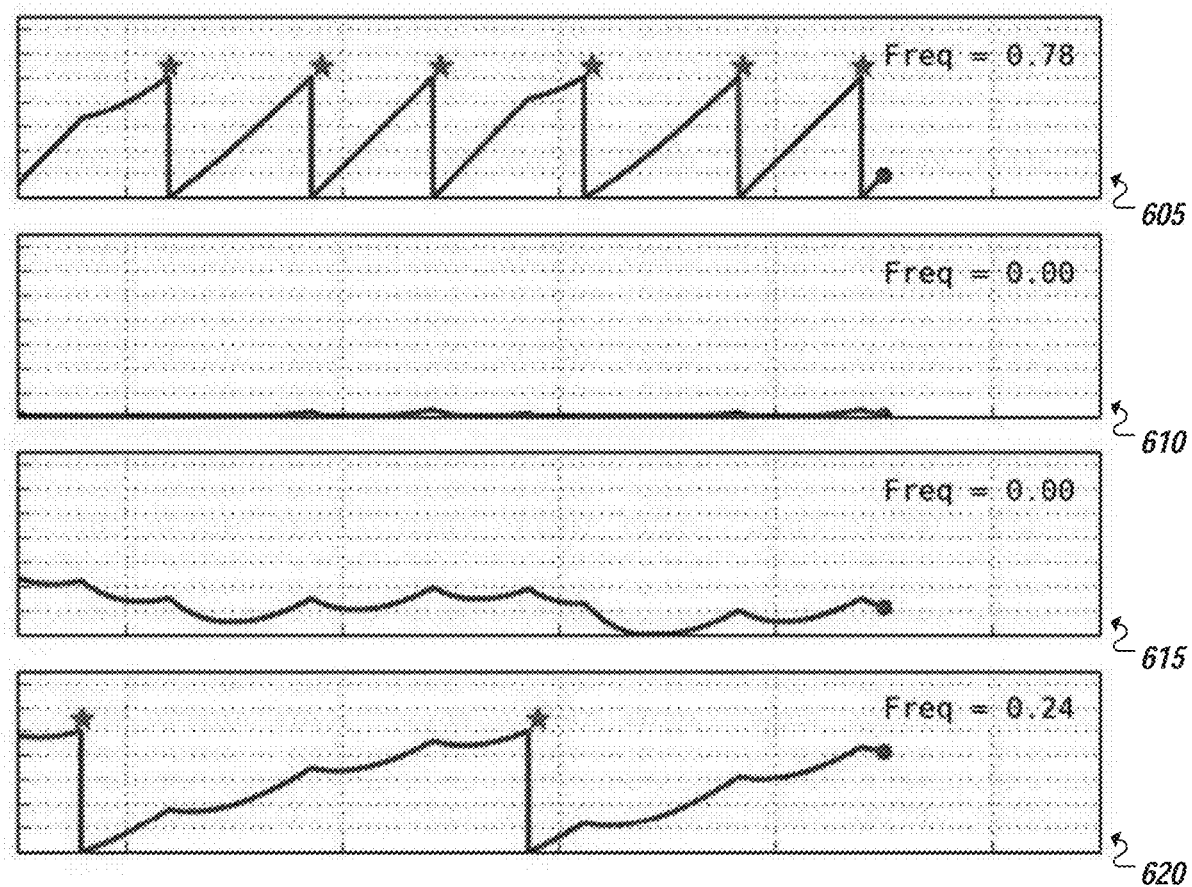

FIGS. 6A-6B illustrate signal diagrams illustrating spiking behavior observed at four nodes (e.g., 605, 610, 615, 620) in an SNN implemented using a neuromorphic computing device employing a network of neuromorphic core elements. The neuromorphic computing device may be programmed to implement a particular SNN that includes a particular number of artificial neurons implemented using the neuromorphic cores. The particular SNN may be further implemented by defining the synaptic connections between the artificial neurons. Parameters of the neurons may be set, including decay rates of the synapses and somas, and weights may be assigned to each synapse, among other configurable parameters to implement the particular SNN. A respective input current or signal may be provided at at least a subset of the neurons in the particular SNN. As illustrated in FIGS. 6A-6B, various spike messages may be generated by the various neurons in the SNN based on their respective parameters, the particular network of synapses connecting the neurons, weights applied to the synapses, etc. Accordingly, the spiking behavior of the neurons may vary across the network. For instance, neuron 605 may spike immediately and continue spiking at semi-regular intervals. Neuron 610, on the other hand may struggle to compile sufficient membrane potential to ever trigger and sent a spiking message on the SNN. FIGS. 6A and 6B further show a spiking frequency, or spiking rate measured by observing spike messages generated by the individual neurons 605, 610, 615, 620. For instance, an interval from time t=0 to t=$t_1$ illustrated in FIG. 6A, a spiking rate of 0.50 may be measured for neuron 605, while rates of 0.00, 0.33, and 0.17 are measured for neurons 610, 615, 620, respectively. FIG. 6B may show spiking behavior of the neurons as measured (as the SNN continues to run) during an interval t=$t_2$ to t=$t_3$, where $t_2 > t_1$. As the SNN has been allowed to continue to run, the spiking rate of each neuron has begun to converge toward a particular value. For instance, in the example of FIG. 6B, the spiking rate of neuron 605 is measured at 0.78, the spiking rate of neuron 620 is measured at 0.24, and the spiking rates of both neurons 610 and 615 are converging to zero. The values shown in the example of FIG. 6B may approximate the "final" equilibrium spiking rates of these four neurons, were the SNN permitted to run infinitely. It should be appreciated that the equilibrium spiking rate values shown in FIGS. 6A-6B are provided as an example only and represent values unique to the particularly configured SNN and neurons in this example. The spiking rates of other SNNs and neurons may be expected to be quite different from those shown in this particular example.

As shown in the examples of FIGS. 6A-6B, it may be assumed that an SNN will reach an equilibrium or steady state after being allowed to run for a time and that spiking rates observed in the SNN may similarly approximate respective steady state values after some period of time (e.g., after some number of time steps). Such equilibrium values may be leveraged in connection with the solving of various matrix inversion problems using an SNN. Particularly, spiking rates may be measured at at least a subset of neurons in an SNN and these values, when at steady state (or at an instance considered to approximate the steady state of the SNN), may represent a result vector to be solved for in the matrix inversion problem.

Figure 7A:
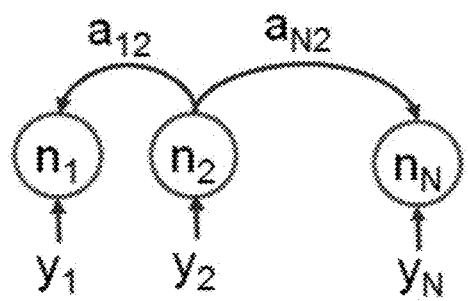
FIGS. 7A-7C are simplified block diagrams illustrating example simplified SNNs configured to approximate solutions for example matrix inverse problems.

As an example, FIG. 7A illustrates an example SNN that may be defined and implemented in a neuromorphic computing device to solve for a vector b that satisfies the equation $r=A^{-1}y$. Utilizing the principles discussed above, a recurrently connected SNN may be programmed and implemented such that the values of matrix A (e.g., $a_{12}$, $a_{N2}$, etc.) are mapped to corresponding synapses defined for the SNN. In one example, a recurrently connected SNN may provide a layer of neurons where each neuron layer connects to the other bi-directionally (i.e., by two synapses each, one synapse in each direction). To solve the problem, the values of the vector y may be adopted as the inputs (e.g., $y_1$, $y_2$, $y_N$, etc.) to be provided to the N neurons (e.g., $n_1$, $n_2$, $n_N$, etc.) provided in the programmed SNN. The SNN may then be allowed to run with the input vector y applied to the SNN and the respective spiking rates (e.g., $r_1$, $r_2$, $r_N$, etc.) of the neurons (e.g., $n_1$, $n_2$, $n_N$, etc.) may be observed (e.g., using a monitoring program through an interface of the neuromorphic computing device, by a management utility local to and executed on the neuromorphic computing device itself, among other examples). The spiking rate values may correspond to the vector r to be solved for in the equation $r=A^{-1}y$. For the spiking rate values to be reliable (and be adopted as an approximate solution of the equation), the SNN may be permitted to run for a time until it is determined that the SNN has reached (or is approaching) a steady state. The steady state may be determined, for instance, by observing that the SNN has for a satisfactory length of time, observing that changes in the values of r are statistically insignificant, among other example criteria. Upon determining that the SNN has reached steady state, the values of the may be recorded and provided as a solution to the inverse matrix equation.

Figure 7B:
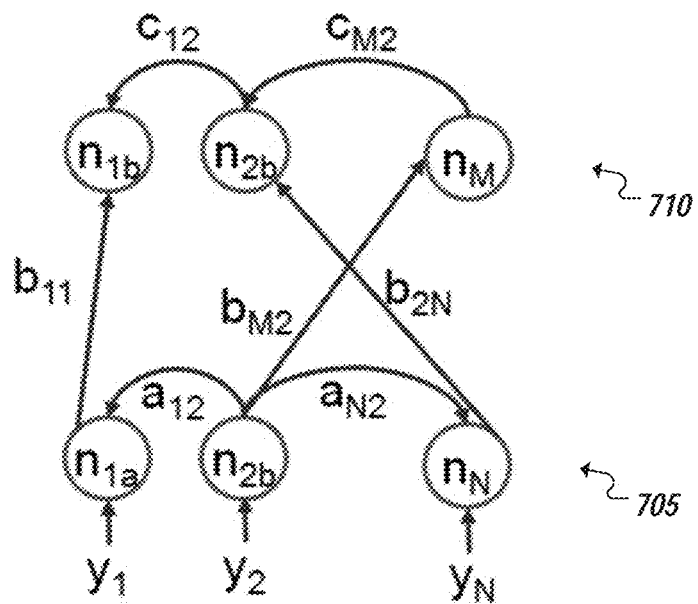

Other, more complex matrix equations may be solved using a configurable neuromorphic computing device, with corresponding SNNs being defined in connection with the solving of these individual equations. For instance, as shown in the example of FIG. 7B, a different SNN may be defined in connection with the solving of a different matrix inverse problem. For instance, the SNN of the example of FIG. 7B may be programmed in connection with the solving of an equation given a matrix $A \in \mathbb{R}^{N \times N}$, $B \in \mathbb{R}^{N \times M}$, $C \in \mathbb{R}^{M \times M}$ and a vector $y \in \mathbb{R}^{\times 1}$, where a vector r is to be found that satisfies $r=C^{-1}BA^{-1}y$. In this example, two layers of neurons are defined in the SNN with synapses (with weights $a_{12}$, $a_{N2}$, etc.) defined to recurrently connect the N neurons in the first layer 705 and further synapses (with weights $b_{11}$, $b_{M2}$, $b_{2N}$, etc.) are defined to connect from each of the N neurons in layer to each of the M neurons in the top layer 710 (it should be appreciated that the illustration in FIG. 7B omits representations of some of these synapses in the interest of simplifying the presentation of the example (and similar simplifications are included in the representations of FIGS. 7A and 7C)). Finally, synapses (with weights $c_{12}$, $c_{M2}$, etc.) to recurrently connect the M neurons in top layer may be defined to provide an inverse of a matrix A (modeled using recurrently connected neurons in the first layer), multiplication by a matrix B (modeled using the connection from the first layer of neurons to the second layer of neurons), and the inverse of a matrix C (modeled using recurrently connected neurons in the top layer). Indeed, the SNN may be programmed such that a number N of neurons are provided in the first layer to correspond with a dimension of the matrix A in the equation, and the synaptic weights $a_{12}$, $a_{N2}$, etc. of the recurrent connections in the first layer are programmed to correspond to values of the matrix A. Further, a second layer of neurons may be programmed in the SNN such that a number of M neurons on implemented to correspond to a dimension of the matrix C in the equation, with the synaptic weights (e.g., $c_{12}$, $c_{M2}$, etc.) of the recurrent connections programmed to correspond to values of matrix C. Last, synapses may be programmed to connect the first layer neurons to the second layer neurons (e.g., by defining the synapses in a routing table of the neuromorphic computing device) and weights (e.g., $b_{11}$, $b_{M2}$, $b_{2N}$, etc.) assigned to correspond with values of the matrix B in the equation. Further, input values may be applied at the first layer neurons to correspond with values of the vector y in the equation and the resulting SNN may be left to run using these inputs until a steady state has been determined to have been reached. In this example, the spiking rates of the second layer, or level, of neurons (e.g., $n_{1b}$, $n_{2b}$, $n_N$, etc.) may be observed and recorded upon reaching the steady state, and these values may be adopted to represent the vector variable r. In other words, the spiking rates observed at this second layer of neurons at equilibrium of the SNN illustrated in FIG. 7B may be taken to be an approximate solution for $r=C^{-1}BA^{-1}y$.

Figure 7C:
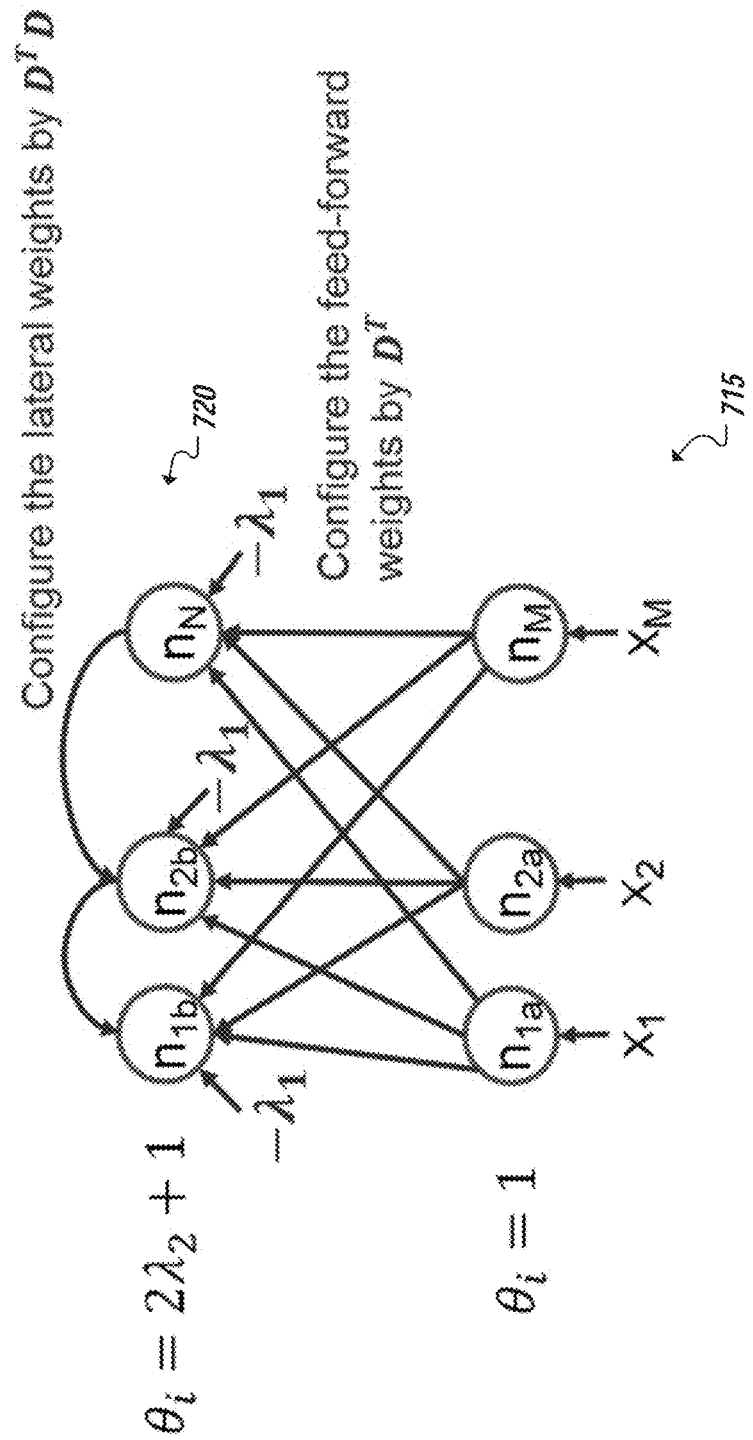

FIG. 7C represents yet another example showing the use of an SNN to determine an approximate solution to a matrix inverse problem. For instance, given a matrix $A \in \mathbb{R}^{M \times N}$ and a vector $y \in \mathbb{R}^{M \times 1}$, a regression problem may be solved to find a vector r that minimizes $\|y-Ar\|_2^2$. Through linear algebra, the solution to such a regression problem may be restated as $r=(A^TA)^{-1}A^Ty$. Based on the principles adopted above, another SNN may be defined that, when run, manifests an approximate solution to the equation. For instance, two layers 715, 720 of neurons may be programmed to be implemented using a neuromorphic computing device with M neurons in a first layer of neurons (e.g., $n_{1a}$, $n_{2a}$, $n_M$, etc.) and N neurons in the second layer (e.g., $n_{1b}$, $n_{2b}$, $n_N$, etc.). The SNN may be programmed with synapses to implement feed-forward connection from the first layer 715 to the second layer 720 of neurons (e.g., by connecting each of the first layer neurons 715 to the second layer neurons) and recurrently connecting the second layer of neurons 720. Synaptic weights may be selected for the feed forward synapses to correspond to values of the transverse matrix $A^T$ in the equation. Synaptic weights for the recurrent synapses in the second layer 720 of neurons may be selected according to the values of $A^TA$. With the SNN programmed, an input may be provided to the first layer of neurons that is selected to correspond to the values of the M dimensional vector y in the equation. The SNN may be run using this input and the spiking rate of the second layer 720 neurons may be observed, such that the spiking rates at an equilibrium condition of the SNN are adopted as the vector r to approximate the regression solution that minimizes $\|y-Ar\|_2^2$, among other examples.

Depending upon how long the SNN is allowed to run, varying levels of precision may be realized in the solving of various matrix inverse problems using the SNN. For instance, spiking rate values recorded at a first steady state condition determined after a during $t_1$ may be less precise than spiking rate values recorded for the same SNN at a second steady state condition determined after some time has elapsed following $t_1$. Indeed, solutions derived from steady state spiking rate values observed in an SNN may be considered approximations of a solution for a corresponding matrix inverse problem or equation that includes matrix inverse multiplication.

In some implementations, an SNN implemented using a digital neuromorphic computing device, may solve additional regression problems (e.g., similar to that shown in the example of FIG. 7C) including classes of sparse coding problems that may be utilized in connection with statistics, machine learning, signal processing, and compressive sensing applications, among other examples. As an example, Equation (9) below represent an "Elastic Net" problem, a general form of sparse coding.

$$\min_{a} L(a) = \frac{1}{2}\|x - Da\|_2^2 + \lambda_1 \|a\|_1 + \lambda_2 \|a\|_2^2, \quad (9)$$

subject to $a_i \geq 0 \ \forall \ i$

In Equation (9), a non-negative input vector $x \in \mathbb{R}^N$ and a normalized non-negative dictionary matrix $D \in \mathbb{R}^{M \times N}$ are provided. The optimization problem finds a non-negative vector $a \in \mathbb{R}^M$ that minimizes the loss function $L(a)$. $\lambda_1$ and $\lambda_2$ are nonnegative regularization parameters determined by applications. FIG. 7C illustrates an example implementation of an SNN 715, which may be configured and implemented to solve Equation (9), by introducing attributes to dampen the accumulation of potential in at least a subset of the neurons in the SNN (e.g., by a providing a negative bias $-\lambda_1$ to inputs of the neuron and increasing the firing threshold of these neurons (e.g., by $2\lambda_2$) to promote realization of a sparse vector result) and observing equilibrium spiking rates for a portion of the neurons in the SNN (e.g., spiking rate of neurons in a layer 720 of the SNN 715). Such an SNN may be well-adapted to solving over complete and sparse coding problems, among other example uses.

In other instances, Equation (9) may form the basis for classes of problems, such as a problem according to a balanced adaptive locally competitive algorithm. Turning to the block diagram 800 illustrated in FIG. 8, an SNN may be defined (and implemented on an example neuromorphic computing device, such as described herein) to solve an Equation (10):

$$\min L(D, a) = \sum_i \left( \frac{1}{2}\|x_i - Da_i\|_2^2 + \lambda_1 \|a_i\|_1 + \lambda_2 \|a_i\|_2^2 \right) \quad (10)$$

where D is an unknown matrix variable, $a_i$ is an unknown vector variable, and $x_i$ is a many data input vector $x_1, x_2, \ldots \in \mathbb{R}^{M \times 1}$, with $\lambda_1$ and $\lambda_2$ being a nonnegative regularization parameter selected by the programmer or manager of the SNN. In this problem, a corresponding SNN may be used to find a matrix D and a set of vectors $a_i$ that minimized the cost function in Equation (10). Such an equation may be used, for instance, to determine a set of unknown features for a known number of clusters in a machine learning application (e.g., based on a sampling of some number of different image files provided as input vectors $x_i$), in which the matrix D corresponds to the desired features.

Figure 8:
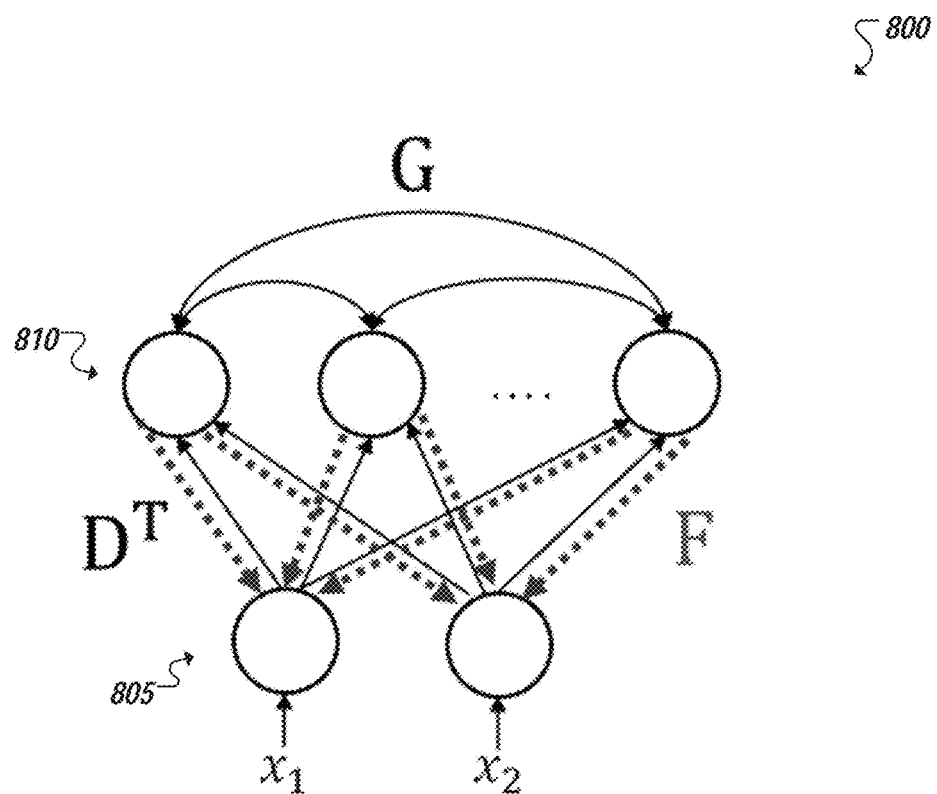
FIG. 8 is a simplified block diagram illustrating an example SNN configured to determine multiple unknowns in matrix multiplication problems.

In the example of FIG. 8, an example SNN is provided with two layers 805, 810 of neurons to solve Equation 10. The first set layer of neurons 805 may include a number of neurons corresponding to a size, or dimension, of the input vectors $x_i$ to be provided to the SNN. The input vectors may constitute data natively having a particular dimension compatible with the selected dimension of $x_i$. In some instances, input data (e.g., digital images of varying sizes (e.g., vector dimensions) may be preprocessed to adjust the dimension to that of $x_i$ (e.g., by performing cropping, rescaling, etc. the image). In some cases, preprocessing of the data may involve the use of another learning algorithm implemented, for instance, using another SNN generated using the neuromorphic computing device (e.g., a machine learning model to classify a particular section of an image as possessing the most useful information, such that any cropping or resizing of the image includes this important information), among other examples.

A second layer of neurons 810 in the SNN may include a number of neurons corresponding to the number of features that are to be discovered using the SNN. The input vectors $x_i$ may be provided to neurons in the first layer 805 and synapses may be defined (e.g., using routing tables of the neuromorphic computing device) to provide feedforward connections from each one of the neurons in the first layer to each one of the neurons in the second layer 810. Further, recurrent connections among the second layer neurons 810 may be defined using artificial synapses implemented using the neuromorphic computing device.

In the example if FIG. 8, feedback synapses (represented by dashed arrows in FIG. 8) may be defined to selectively connect from the second layer neurons to the first layer neurons for use in iteratively tuning synaptic weights to be applied to the other synapses (represented by solid arrows) connecting the first layer 805 to the second layer 810 and recurrently connecting the second layer neurons 810. The desired feature matrix D may correspond to the feedforward synapses connecting the first layer neurons 805 to the second layer neurons 810 in the SNN. Accordingly, the weights of these synapses are initially set as random values for the SNN. Further, in this example, the weights G to be applied to the recurrently connecting synapses in the second layer 810 and weights to be applied to the selectively enabled feedback synapses (from the second layer 810 to the first layer 805) may also be initially set as random values. In one example, the weights (and corresponding matrices D, G, F) of these three sets of synapses may be determined through an algorithm that is to iteratively adjust, or train, the synapses' weightings according to a set of input vectors $x_i$ to be provided to the SNN implemented in a neuromorphic computing device.

Figure 9A:
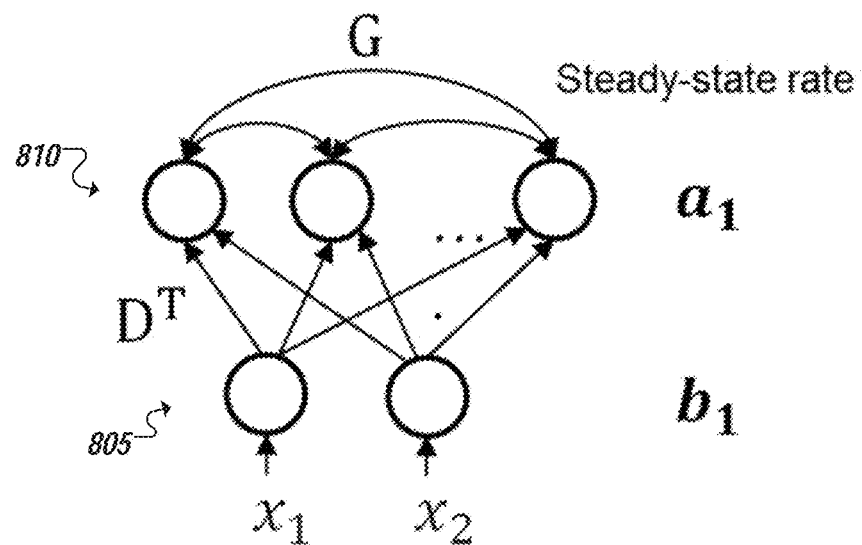
FIGS. 9A-9B are a representation of the use of an SNN similar to that shown in FIG. 8.
Figure 9B:
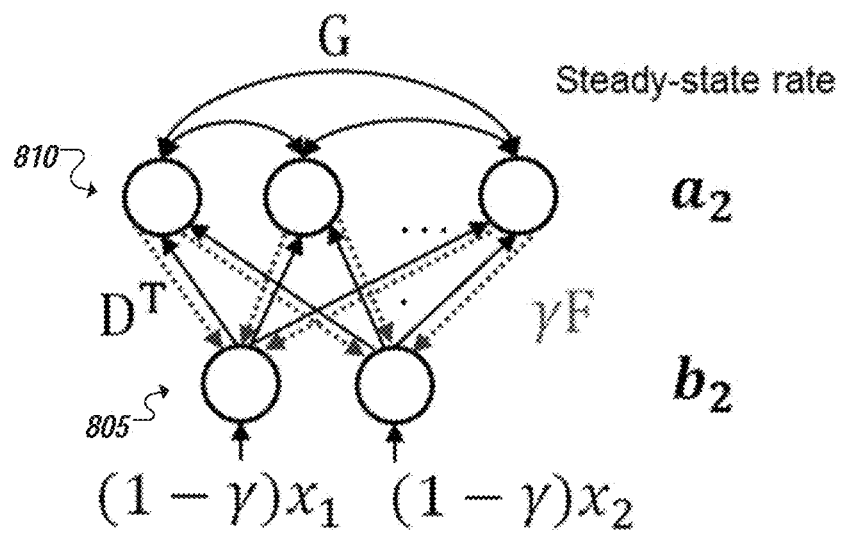

Turning to FIGS. 9A-9B, a technique or algorithm may be utilized to derive the weights for synapses in an example SNN configured according to the example SNN of FIG. 8. A number of different input vectors may be provided as $x_i$. Such a collection of input vectors may correspond to a vector representation of a digital image, digital document, social network entity, or other entity to be classified using machine learning. The number of neurons provided in the SNN may correspond to a dimension of the input vector (e.g., the number of neurons in the first layer 805) and the number of clusters in which a data set is to be partitioned (e.g., represented by the number of neurons in the second layer 810). Each data vector may belong to multiple clusters. In this particular example, the optimal or best weights of the synapses connecting the neurons (in layers 805 and 810) may be unknown. All that may be known is the desired structure of the SNN and a set of input vectors to be provided to the SNN. Iterations of the SNN may be run to determine the values of the unknown weights. These iterations may also reveal steady state values of spiking rates of one or more of the neurons in the SNN when the determined weights are applied to the SNN.

As shown in the example of FIG. 9A, the best weights D, G, F of the synapses of an SNN defined to be implemented using a neuromorphic computing device may be unknown. To being a technique for determining these weights of the synapses, initial weights may be selected (e.g., randomly or pseudorandomly, or using any other methodology) and set for the SNN (e.g., by programming corresponding neuromorphic cores utilized to implement the neurons). The SNN may then be run using a first one of a collection of input vectors $x_i$ provided as an input to the neurons in the first layer 805 of the example SNN (e.g., as vector elements $x_1$, $x_2$, $x_3$, etc. input to respective neurons in the first layer 805). Further, as shown in the example of FIG. 9A, feedback synapses connecting second layer neurons 810 to first layer neurons 805 may be turned off, or disabled, using the neuromorphic computing device (e.g., by providing a command from a management system to the neuromorphic computing device or through logic executed locally on the neuromorphic computing device, among other examples). The SNN may be run with these feedback synapses disabled and a first one of the input vectors provided as an input, and the SNN may be allowed to run until a steady state or equilibrium condition is observed or otherwise detected (e.g., by logic on the neuromorphic computing device or by logic in a system external to the neuromorphic computing device utilized to manage performance of an algorithm on the SNN). In some instances, spiking rates of at least a subset of the neurons in the SNN may be monitored (e.g., by monitoring traffic on routers of the neuromorphic computing device) and a steady state may be determined by identifying a convergence or steady state spiking rate for these neurons. In the example of FIG. 9A, spiking rates may be determined for each of the neurons in the first layer 805 (with the spiking rate values of these neurons 805 represented by vector $b_1$), as well as for neurons in the second layer 810 (with the spiking rate values of these neurons 805 represented by vector $a_1$).

Upon reaching steady state in the example of FIG. 9A, with a given input applied and the feedback synapses disabled, and collecting the corresponding spiking rate values $a_1$ and $b_1$, the feedback synapses may be enabled and the given input (or a modification of the given input) may be applied to the same SNN (with the initially assigned weight values D, G, F), as shown in the example of FIG. 9B. In this example, a synaptic modulation parameter value may be applied to rescale the weights of synapses. For instance, the input $x_1$ to the first layer 805 is rescaled by a scalar value $(1-\gamma)$, and the feedback synapses are rescaled by a value $\gamma$. In one example, a preferred value of $\gamma$ may be 0.6, although a variety of other $\gamma$ values may be employed in various implementations. With this modified version of the input vector applied and the feedback synapses enabled (as in FIG. 9B) the SNN may again be allowed to run until a steady state is reached. The respective spiking rates can again be read at this steady state, with the resulting steady state spiking rates of the top layer neurons 810 being represented in vector $a_2$ and the steady state spiking rates of the first layer neurons 815 represented in vector $b_2$. With this iteration (including a first steady state achieved with feedback synapses disabled followed by a second steady state achieved with feedback synapses enabled) completed, the synaptic weights D, G, F applied to the synapses during this iteration may be adjusted in preparation for a next iteration. In other implementations, each interaction may also include two stages with feedback synapses disabled and enabled, but with the stages performed in reverse (e.g., with the enabled feedback synapse stage performed first, followed by the disabled feedback synapse stage (and the sign of the learning rule reversed)). In one example, the adjustment of the synaptic weights for a next iteration may be adjusted based on the steady state spiking rates observed in the preceding iteration. In one example, the synaptic weights may be adjusted according to the equations:

$$F \leftarrow F + \eta_3(b_1-b_2)a_2^T \quad (11)$$

$$D \leftarrow D + \eta_2(b_1-b_2)a_2^T \quad (12)$$

$$G \leftarrow G + \eta_1(a_2-a_1)a_2^T \quad (13)$$

Where $\eta_1$ and $\eta_2$ are the learning rates and $a_1$, $a_2$, $b_1$, and $b_2$ are the steady spiking rates determined in the preceding iteration. In one example, the learning rates may be determined by the programmer/user implementing the procedure. In some cases, the learning rates may be selected such that $\eta_1 > \eta_2$, and $\eta_1 > \eta_3$.

The synaptic weight update rule in Equation (11) may be implemented locally on the distributed neurons. The weight adjustment of a synapse may be computed and processed by the destination neuron. For example, to focus on how the synaptic weights from neuron i to neuron j, Equation (11) can be rewritten as:

$$f_{ji} \leftarrow f_{ji} + \eta_3(b_{1j}-b_{2j})a_{2i}$$

where $f_{ji}$ is the (j,i)-th entry of the matrix F, $a_{2i}$ is the i-th entry of the vector $a_2$, $b_{1j}$ is the j-th entry of the vector $b_1$, and $b_{2j}$ is the j-th entry of the vector $b_2$, etc. Neuron j can measure the quantity of $b_{1j}$, $b_{1j}$, and $a_{2j}$ locally and compute the desired amount for weight adjustment. There are many possible ways to measure the firing rate. For example, one can use box windows, exponential filter. One may also use the STDP mechanism to measure the firing rate difference $(b_{1j}-b_{2j})$.

The synaptic weight update rule in Equation (12) may be implemented locally on the distributed neurons. The weight adjustment of a synapse may be computed and processed by the destination neuron. For example, to focus on how the synaptic weights from neuron i to neuron j, Equation (12) can be rewritten as:

$$d_{ji} \leftarrow d_{ji} + \eta_2(b_{1j}-b_{2j})a_{2i}$$

where $d_{ji}$ is the (j,i)-th entry of the matrix D, $a_{2i}$ is the i-th entry of the vector $a_2$, $b_{1j}$ is the j-th entry of the vector $b_1$, and $b_{2j}$ is the j-th entry of the vector $b_2$. Neuron j can measure the quantity of $b_{1j}$, $b_{1j}$, and $a_{2j}$ locally and compute the desired amount for weight adjustment. There are many possible ways to measure the firing rate. For example, one can use box windows, exponential filter. One may also use the STDP mechanism to measure the firing rate difference $(b_{1j}-b_{2j})$.

The synaptic weight update rule in Equation (13) may be implemented locally on the distributed neurons. The weight adjustment of a synapse may be computed and processed by the destination neuron. For example, to focus on how the synaptic weights from neuron i to neuron j, Equation (13) can be rewritten as:

$$g_{ji} \leftarrow g_{ji} + \eta_1(a_{1j}-a_{2j})a_{2i}$$

where $g_{ji}$ is the (j,i)-th entry of the matrix G, $a_{2i}$ is the i-th entry of the vector $a_2$, $b_{1j}$ is the j-th entry of the vector $a_1$, and $a_{2j}$ is the j-th entry of the vector $a_2$. Neuron j can measure the quantity of $a_{1j}$, $a_{2j}$, and $a_{2i}$ locally and compute the desired amount for weight adjustment. There are many possible ways to measure the firing rate. For example, one can use box windows, exponential filter. One may also use the STDP mechanism to measure the firing rate difference ($a_{1j}$–$a_{2j}$).

With the synaptic weights adjusted, a next iteration may begin with a second one of the collection of input vectors (e.g., $x_2$) being applied to the SNN (as in FIG. 9A). Steady state spiking rates $a_1$, $b_1$ may be determined (with the feedback synapses disabled and new synaptic weights applied) and then the feedback synapses may be enabled, input (e.g., $x_2$) adjusted and the second steady spiking rates $a_2$, $b_2$ determined. The steady state spiking rates determined from this iteration may then be used in like manner to determine an adjustment to be made to the synaptic weights D, G, F, which are to be applied in the following iteration (e.g., when an input vector $x_3$ is to be utilized), and so on, until a convergence of the synaptic weights D, G, F emerges from the iterative adjustments based on these iterations. Many iterations may be initiated and completed using the set of input vectors until convergence of the synaptic weights D, G, F of the SNN is determined. In some cases, every one of the input vectors $x_i$ (e.g., sample digital images, documents, or other vector inputs) in the set may be used, one in each iteration, before convergence is recognized. Indeed, in some instances, one or more of the input vectors $x_i$ may be provided as the input in more than one of the iterations (e.g., because all of the other available input vectors have also already been used) to derive the unknown matrix value(s) corresponding to the synaptic weights D, G, F being adjusted in each iteration. In some cases, thousands of iterations may be run in order to determine a convergence in the synaptic weights D, G, F, among other examples.

In one example, convergence of the synaptic weights through the repeated iterations running the SNNs illustrated in FIGS. 9A-9B may be determined based on an identification that the values of each of the synaptic weight matrices D, G, F converge. The values of corresponding spiking rate vectors $a_1$, $a_2$, $b_1$, and $b_2$ may also be observed to converge. The following relationships may also indicate that synaptic weight matrices D, G, F are converging or have converged:

$$F \approx D$$

$$G \approx D^T D$$

In some implementations, a system observing the performance of these iterations using the SNN (or logic local to the neuromorphic computing device implementing the SNN) may use various statistical methodologies and thresholds to determine that a convergence of the synaptic weights D, G, F has occurred. Convergence of the synaptic weight matrices D, G, F signifies that a solution for the unknown matrices has been determined based on the set of input vectors. Likewise, values of the vectors a, b may also be determined based on the steady state spiking thresholds observed when the feedback synapses are disabled and the final synaptic weight values for D, G, F are applied to the SNN. In other words, a solution for the equation:

$$\min L(D, a) = \sum_i \left( \frac{1}{2} \|x_i - Da_i\|_2^2 + \lambda_1 \|a\|_1 + \lambda_2 \|a_i\|_2^2 \right)$$

may be determined, with the converged value of synaptic weights D representing the unknown matric value D in the equation, and the converged value of steady state spiking rates $a_1$ (of the second layer neurons 810) representing the unknown vector value $a_i$ in the equation provided to the SNN during the iterations.

Figure 10:
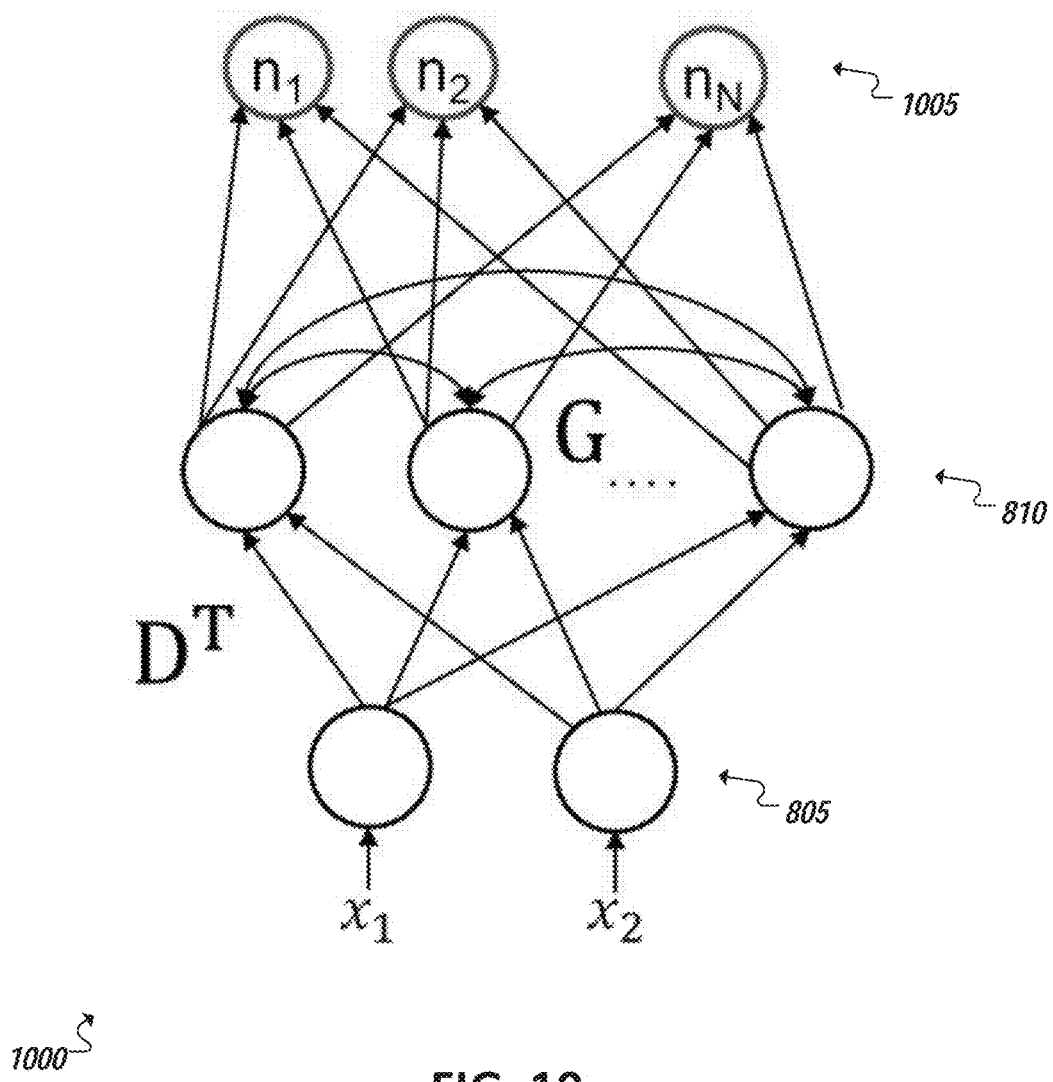
FIG. 10 is a simplified block diagram illustrating a portion of an example spiking neural network (SNN) configured to classify input vectors.

As noted above, in some implementations, the implementation of an example SNN according to the examples of FIGS. 8-9B may be in accordance with the unsupervised training of a neural network to be used, for instance, in classification of various data. The synaptic weights of D may correspond to the unknown features to be learned from a set of vector inputs $x_i$. $a_i$, in this example, represents a set of feature coefficients that encodes the vector input $x_i$. Given $a_i$ and D, one can reconstruct the input by $x_i = D a_i$. Solving for the unknown feature set D may be accomplished in an unsupervised manner according to the technique described in connection with the examples of FIGS. 9A-9B above. This may train the SNN for later use with other inputs. Additionally, as shown in the block diagram 1000 in the example of FIG. 10, with the unknown synaptic weights (corresponding to features of clusters represented by the neurons in the second layer 810) determined, the trained SNN may be extended with an additional layer of neurons 1005 corresponding to classifiers to implement a deep learning solution. For example, the additional layer 1005 may be a softmax classifier or a support vector machine (SVM) classifier. The classifier may be trained by a set of labeled data, for which the feature coefficients $a_i$ are first computed by the SNN, and use $a_i$ as the input to the classifier. The classifier may be trained using standard training methods, for example, using a gradient descent algorithm of convex optimization, among other examples. The classifier may be implemented using spiking neurons, or in a general-purpose computing platform, among other examples.

Figure 11A:
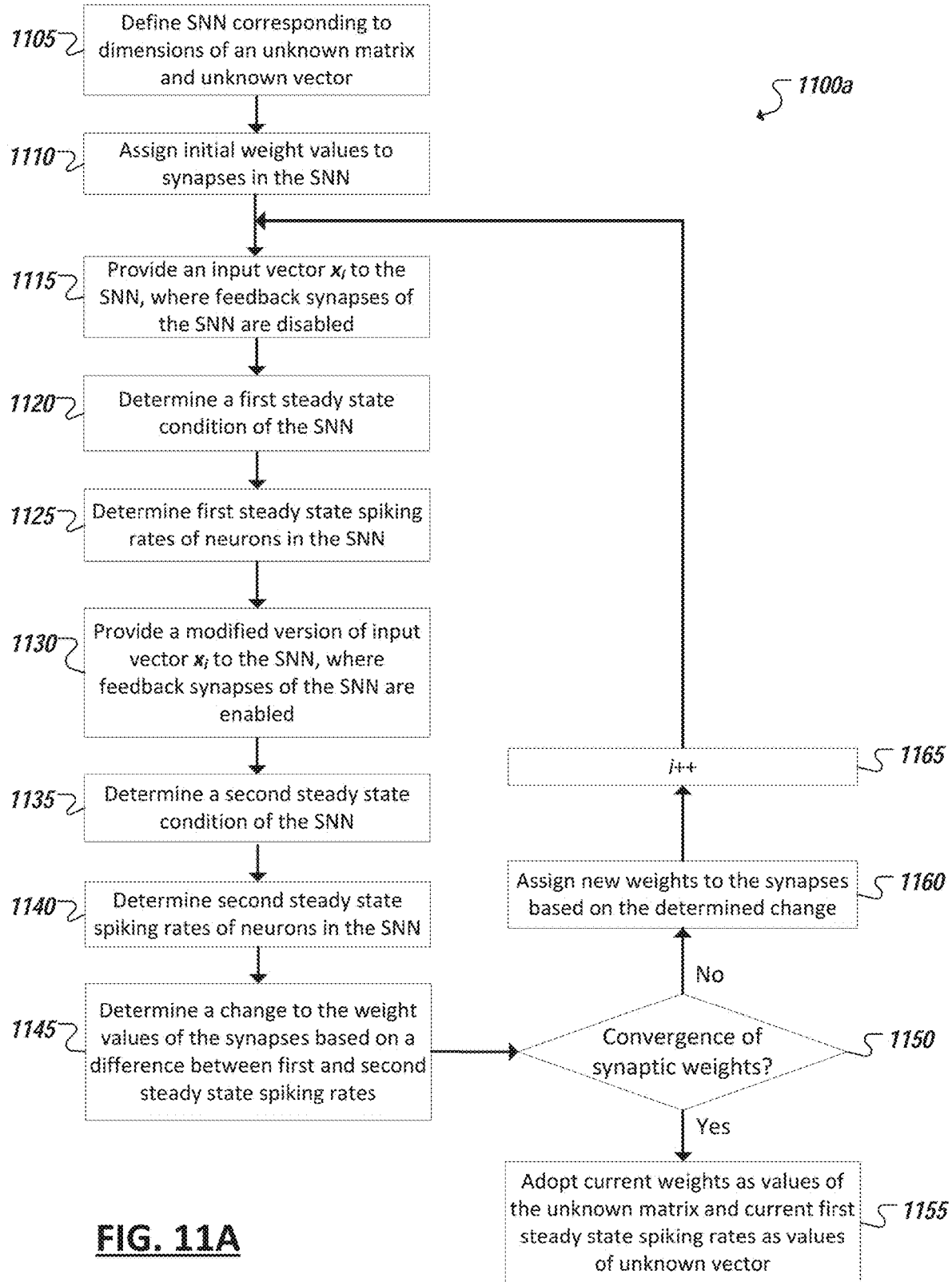
FIGS. 11A-11B are flowcharts illustrating example techniques involving solving for unknown matrix values in equations utilizing SNNs.
Figure 11B:
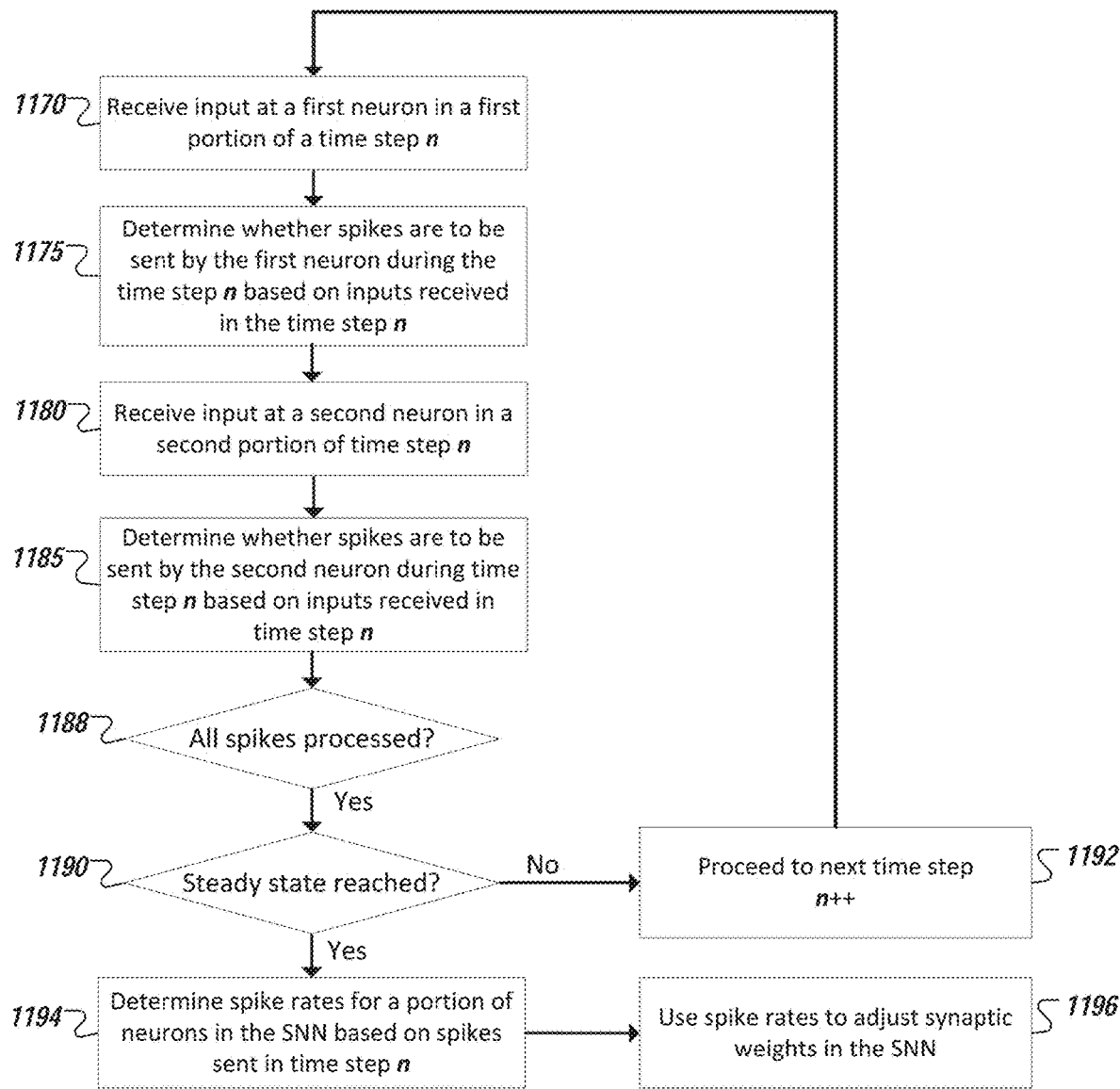

FIGS. 11A-11B are flowcharts 1100a-b illustrating example techniques involving solving for unknown matrix variables in equations utilizing spiking neural networks (SNNs). For instance, in the example of FIG. 11A, a technique is shown for determining values for at least two unknown in an equation, including an unknown matrix and an unknown vector. An SNN may be defined 1105 and implemented using a neuromorphic computing device to implement at least a two layered SNN with the dimensions of the layers corresponding to dimensions of the unknown matrix and unknown vector. Feed forward synaptic connections can connect from a first layer of neurons to a second layer of neurons implemented in the SNN, and recurrent synaptic connections can connect second layer neurons to other second layer neurons. Further, feedback synapses capable of being turned on and off may be defined and implemented to connect from the second layer of neurons to the first layer of neurons implemented in the SNN. The SNN may be defined such that the weights of the feedforward synapses map to the unknown values of the matrix and steady state spiking rates of the second layer neurons may map to values of the unknown vector in the equation.

In an initial iteration, as the synaptic weights of the feedforward synapses may be unknown, as well as weights for the corresponding recurrent synapses and feedback synapses, weights may be arbitrarily, randomly, or otherwise assigned 1110 to and implemented in the artificial synapses of the SNN. A data set of multiple distinct input vectors $x_i$ may be used and provided 1115, one at a time to the first layer of neurons in the SNN. In a first iteration, a first one of the input vectors (e.g., $x_1$) may be provided 1115 to the SNN with the feedback synapses disabled. The SNN may be run responsive to the provided input until a steady state emerges and is determined 1120. At steady state, steady state spiking rates of at least a particular portion of the neurons may be determined 1125. In some cases, respective steady state spiking rates may be determined for all of the first and second layer neurons. The SNN may then be reset with the feedback synapses enabled and a modified version of the previously provided input vector (e.g., $x_1$ $(1-\gamma)$) provided 1130 to the first layer neurons in the SNN (with the initially assigned synaptic weights still applied within the SNN). The SNN (with feedback synapses enabled) may again be run until it is determined 1135 that the SNN has come to a (second) steady state (i.e., within this first iteration). Likewise, steady state firing rates for the selected neurons may be determined 1140, this time corresponding to the second steady state determined 1130 for the iteration.

It is anticipated, that the example technique of FIG. 11A will involve numerous iterations of steps 1115-1140, with different input vectors being used in consecutive iterations, and different synaptic weights being applied in each iteration. After each iteration, a change to the synaptic weights applied in the iteration may be determined 1145 based on a comparison, or calculated difference, between steady state spiking rates observed in the first steady state (with feedback synapses disabled) and the second steady state (with feedback synapses enabled). The change may indicate that a statistically insignificant change is to be offered for the synaptic weights based on the iteration and this (and/or a series of previous iterations also resulting in a modest or minimal synaptic weight change determination 1145) may cause a determination that the synaptic weights determined from the iterations is converging. If the synaptic weights have converged (as determined at 1150), the converged synaptic weight values may be adopted as values of the unknown matrix. At convergence, the observed steady state spiking rates should also converge, and these "final" steady spiking rates may be adopted as values of the unknown vector (at 1155).

On the other hand, if convergence of the synaptic weights has not been determined (e.g., by logic monitoring the technique, either executed locally on the neuromorphic computing device or on a management system), another iteration may be ordered and initiated. For instance, if it is determined that the synaptic weights have not converged (at 1150), new synaptic weights may be assigned to the SNN in accordance with the change determined (at 1145) in the preceding iteration. Another, different one of the vector inputs may be selected 1165 (e.g., by incrementing $x_i$ (e.g., such that input vector $x_2$ is used in lieu of input vector $x_1$ used in the preceding iteration)) and this input vector may be provided 1115 to the SNN (implemented in this iteration with the new synaptic weights based on results of the preceding iteration), with the feedback synapse again disabled. The corresponding steady state may be determined 1125 along with the steady state spiking rates (at 1125), and the SNN may be run again within the iteration with the feedback synapses enabled and modified version of the current input vector (e.g., $x_2(1-\gamma)$) applied 1130 to determine 1135 a second steady state and corresponding steady state spiking rates (at 1140). An additional iterative change to the synaptic weights may be determined 1145 based on this second iteration and so on until one of the iterations is determined to correspond to a convergence of the synaptic weights within the SNN based on the multiple input vectors and iterations performed.

In the example of FIG. 11B, a neuromorphic computing device may include a network of neuromorphic processing cores (e.g., each with a respective arithmetic processing unit and local memory) that may each be used to implement one or more artificial neurons and define synapses between the artificial neurons to construct an SNN. In the example of FIG. 12B, a single core of the neuromorphic computing device may implement multiple neurons within the SNN and may time multiplex access to the core's resources (e.g., processor resources) by the processes (e.g., dendritic and somatic modeling processes) used to implement each of the multiple neurons. Time steps may be defined and utilized with the neuromorphic computing device to synchronize the varied processes of the multiple core implementing the various neurons with an example SNN. For instance, to begin a time step, a neuromorphic core may provide for the neurons to send spikes that are to be sent (e.g., based on previously received presynaptic spikes). In some implementations, a time synchronization barrier process may be utilized by the neuromorphic computing device to guarantee that all spikes scheduled in the previous time step have been delivered before moving to the next time step. Spikes may arrive at neurons in the SNN in arbitrary sequential order, and cause subsequent dendrite and soma process at the receiving neurons (e.g., all in the same time step). For instance, an input (e.g., provided to the neuron as part of an input vector or as a spike message from another connected neuron) may be received 1170 at a first one of multiple neurons concurrently implemented for an SNN by a single one of the cores in the neuromorphic computing device (e.g., in connection with a particular iteration of the technique illustrated in the example of FIG. 11A). For instance, during a time step n=0, an input may be received 1170 at the first neuron and the corresponding neuromorphic core may determine 1175 (e.g., from previously received spikes, based on parameters configured for the first neuron) whether spikes are to be sent by the first neuron in response to inputs received during time step n=0 (e.g., if the firing potential threshold of the neuron has increased and been met during the time step). The core may then use time multiplexing to turn to another, second one of the neurons implemented by the core during the same time step n=0 (i.e., but in another portion of the time step), process 1180 any inputs (e.g., external input currents or spike messages from other neurons in the SNN) and determine whether any such inputs caused the potential of the neuron to meet or exceed its firing threshold (and cause a spike to be sent (either in the same or an immediately subsequent time step, depending on the configuration of the SNN)). The core can continue dividing the time step and time multiplexing its processing resources until all of the neurons it implements in the SNN have been processed to identify any received presynaptic spikes and determine any resulting postsynaptic spikes. When all spikes are determined to be processed (e.g., 1188) the SNN may be monitored (e.g., by a process local to or remote from the neuromorphic computing device) to determine 1190 whether a steady state has been reached in the running SNN. If the steady state has not been reached, the SNN may be allowed to continue to run onto a next time step 1192 (e.g., n++, or n=1 in this example). In one implementation, the next time step may begin with the firing of spikes determined in the preceding time step, followed by the processing of spikes and determination of additional spikes (e.g., steps 1170, 1175, 1180, 1185, etc.) for each of the neurons implemented, or hosted, at a respective neuromorphic core. This may continue until a steady state is determined 1190 to be reached. Steady state spiking rate values for a particular set of neurons within the SNN may be determined 1194 and a solution to an equation modeled by the SNN may be determined from the spike rate identified in the steady state. For instance, as noted in the example of FIG. 11A above, steady state spike rates determined from multiple iterations of an SNN may be utilized to determine 1196 iterative changes to synaptic weights of the SNN to eventually derive a final set of synaptic weights for the SNN (e.g., based on a set of training data (e.g., input vectors $x_i$) provided during the iterations), among other example uses. The synaptic weight adjustment 1196 may be implemented on distributed individual neurons, where individual neurons measures the firing rates of its neighboring neuron and itself, and compute and apply the weight changes correspondingly, among other examples.

Figure 12:
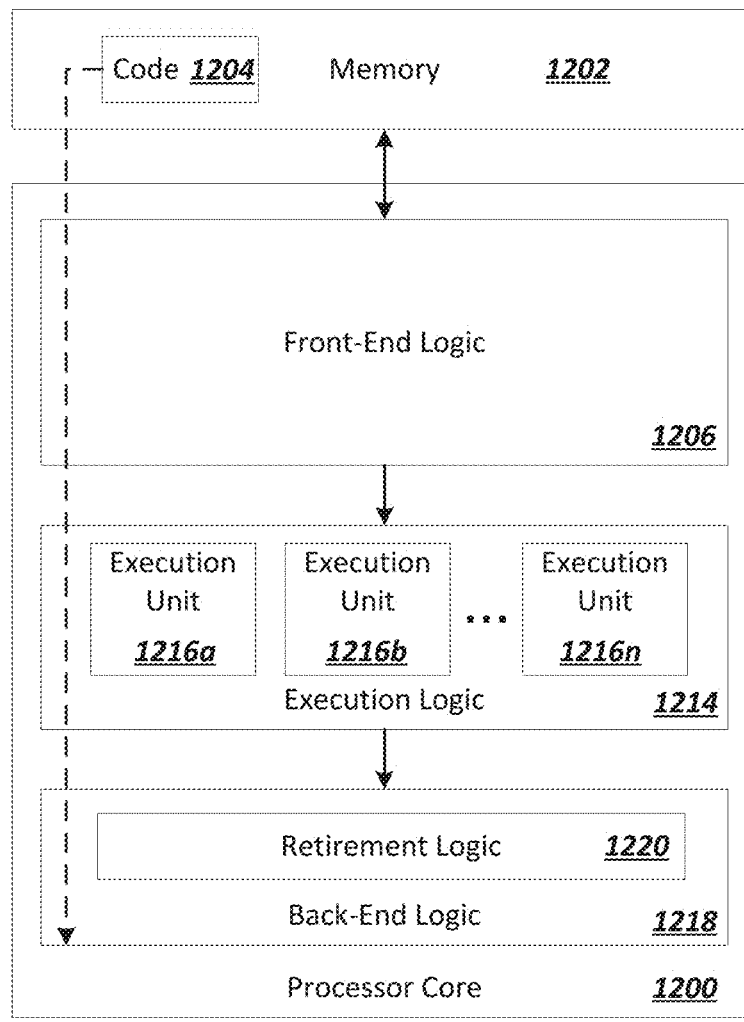
FIG. 12 is a block diagram of an exemplary processor in accordance with one embodiment.
Figure 13:
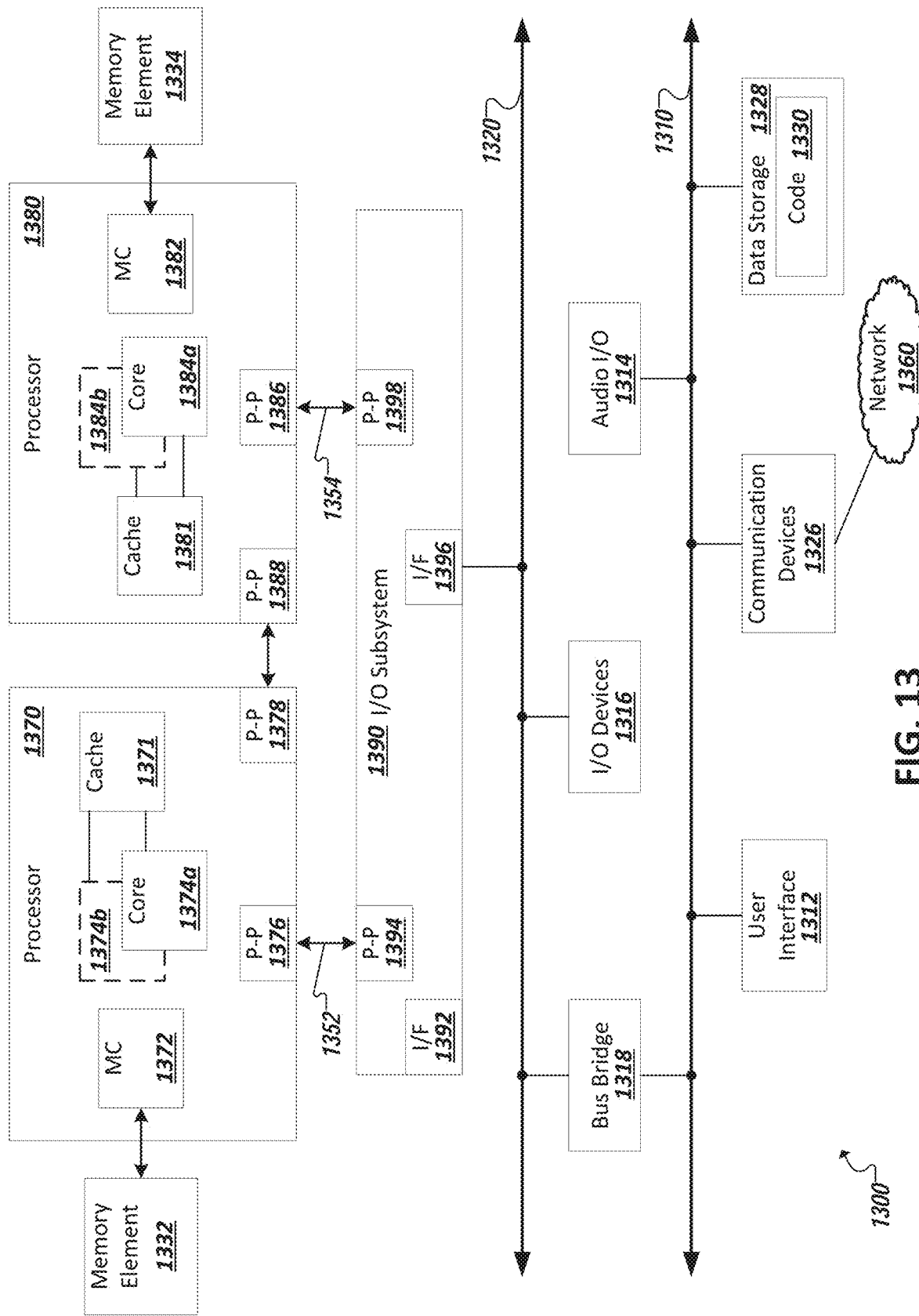
FIG. 13 is a block diagram of an exemplary computing system in accordance with one embodiment.

FIGS. 12-13 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 12-13.

FIG. 12 is an example illustration of a processor according to an embodiment. Processor 1200 is an example of a type of hardware device that can be used in connection with the implementations above. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a computing system 1300 that is arranged in a point-to-point (PtP) configuration according to an embodiment. In particular, FIG. 13 shows a system where processors, memory, and input/output devices are interconnected by a number of point-to-point interfaces. Generally, one or more of the computing systems described herein may be configured in the same or similar manner as computing system 1300.

Processors 1370 and 1380 may also each include integrated memory controller logic (MC) 1372 and 1382 to communicate with memory elements 1332 and 1334. In alternative embodiments, memory controller logic 1372 and 1382 may be discrete logic separate from processors 1370 and 1380. Memory elements 1332 and/or 1334 may store various data to be used by processors 1370 and 1380 in achieving operations and functionality outlined herein.

Processors 1370 and 1380 may be any type of processor, such as those discussed in connection with other figures. Processors 1370 and 1380 may exchange data via a point-to-point (PtP) interface 1350 using point-to-point interface circuits 1378 and 1388, respectively. Processors 1370 and 1380 may each exchange data with a chipset 1390 via individual point-to-point interfaces 1352 and 1354 using point-to-point interface circuits 1376, 1386, 1394, and 1398. Chipset 1390 may also exchange data with a high-performance graphics circuit 1338 via a high-performance graphics interface 1339, using an interface circuit 1392, which could be a PtP interface circuit. In alternative embodiments, any or all of the PtP links illustrated in FIG. 13 could be implemented as a multi-drop bus rather than a PtP link.

Chipset 1390 may be in communication with a bus 1320 via an interface circuit 1396. Bus 1320 may have one or more devices that communicate over it, such as a bus bridge 1318 and I/O devices 1316. Via a bus 1310, bus bridge 1318 may be in communication with other devices such as a user interface 1312 (such as a keyboard, mouse, touchscreen, or other input devices), communication devices 1326 (such as modems, network interface devices, or other types of communication devices that may communicate through a computer network 1360), audio I/O devices 1314, and/or a data storage device 1328. Data storage device 1328 may store code 1330, which may be executed by processors 1370 and/or 1380. In alternative embodiments, any portions of the bus architectures could be implemented with one or more PtP links.

The computer system depicted in FIG. 13 is a schematic illustration of an embodiment of a computing system that may be utilized to implement various embodiments discussed herein. It will be appreciated that various components of the system depicted in FIG. 13 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, where the instructions when executed on a machine, cause the machine to: define a spiking neural network (SNN), where the SNN is to include: a plurality of neurons, a first set of the plurality of synapses to define feed-forward connections from a first subset of the plurality of neurons to a second subset of the plurality of neurons, a second subset of the plurality of synapses to define recurrent connections between the second subset of neurons, and a third subset of the plurality of synapses to define feedback connections from the second subset of neurons to the first subset of neurons; provide a plurality of input vectors to the SNN to iteratively modify weight values of the plurality of synapses, where iteratively modifying the plurality of synapses is to include, in each iteration: providing one of the plurality of input vectors to the SNN with the third subset of synapses disabled; determining first steady state spiking rates of at least the second subset of neurons with the respective input vector provided and the third subset of synapses disabled; determining second spiking rates of at least the second subset of neurons with the third subset of synapses enabled and based on the respective input vector; modifying weight values of the plurality of synapses based on a difference between the first spiking rates and the second spiking rates; determine a convergence of weight values of the plurality of synapses to a particular set of weight values, where the particular set of weight values are to correspond to an unknown matrix in an equation.

Example 2 may include the subject matter of example 1, where first steady state spiking rates and second steady state spiking rates are to be determined for both the first and second subsets of neurons.

Example 3 may include the subject matter of any one of examples 1-2, where the weight values are to be modified according to equations:

$$F \leftarrow F + \eta_3(b_1 - b_2)a_2^T$$

$$D \leftarrow D + \eta_2(b_1 - b_2)a_2^T, \text{ and}$$

$$G \leftarrow G + \eta_1(a_2 - a_1)a_2^T,$$

where G includes a matrix of weight values for the second subset of synapses, D includes a matrix of weight values for the first subset of synapses, $a_1$ includes first steady state spiking rates of the second subset of neurons, $a_2$ includes second steady state spiking rates of the second subset of neurons, $b_1$ includes first steady state spiking rates of the first subset of neurons, $b_2$ includes second steady state spiking rates of the first subset of neurons, includes a first learning rate, and $\eta_2$ includes a second learning rate.

Example 4 may include the subject matter of any one of examples 1-3, where a modified version of the respective input vector is to be provided to the SNN when the third subset of synapses are enabled and the second steady state spiking rates are determined with the modified version of the respective input vector provided to the SNN.

Example 5 may include the subject matter of example 4, where the respective input vector includes $x_i$ and the modified version of the respective input vector is to be according to $(1-\gamma) x_i$, where $\gamma$ is a variance coefficient.

Example 6 may include the subject matter of any one of examples 1-5, where the SNN is to be defined for a neuromorphic computing device to implement the SNN.

Example 7 may include the subject matter of example 6, where defining the SNN includes providing definition data to the neuromorphic computing device to cause the neuromorphic computing device to implement the SNN.

Example 8 may include the subject matter of example 7, where the plurality of synapses are to be defined within the neuromorphic computing device in one or more routing tables of the neuromorphic computing device.

Example 9 may include the subject matter of any one of examples 7-8, where the neuromorphic computing device includes a plurality of neuromorphic processing cores interconnected by one or more routers of the neuromorphic computing device.

Example 10 may include the subject matter of example 1-9, where the instructions, when executed, further cause the machine to determine final steady state spiking rates for at least the second subset of neurons corresponding to the particular set of weight values.

Example 11 may include the subject matter of example 10, where the final steady state spiking rates are to correspond to values of an unknown vector in the equation.

Example 12 may include the subject matter of example 11, where the number of neurons in the SNN is based on dimensions of the unknown matrix and a dimension of the unknown vector.

Example 13 may include the subject matter of any one of examples 1-12, where random weight values are to be applied to the plurality of synapses as initial weight values for the plurality of synapses.

Example 14 may include the subject matter of any one of examples 1-13, where the second subset of neurons are to correspond to a plurality of clusters and the unknown matrix is to correspond to unknown features of the plurality of clusters.

Example 14 may include the subject matter of any one of examples 1-14, where the instructions are further to determine a first steady state condition of the SNN with the respective input vector provided and the third subset of synapses disabled and determine a second steady state condition of the SNN with the third subset of synapses enabled and based on the respective input vector, where the first steady state spiking rates are determined in association with the first steady state condition, and the second steady state spiking rates are determined in association with the second steady state condition.

Example 15 is a method including: defining a spiking neural network (SNN) including a plurality of artificial neurons interconnected by a plurality of artificial synapses, where the SNN is to include a first subset of the plurality of synapses to define feedforward connections from a first subset of the plurality of neurons to a second subset of the plurality of neurons, a second subset of the plurality of synapses to define recurrent connections between the second subset of neurons, and a third subset of the plurality of synapses to define feedback connections from the second subset of neurons to the first subset of neurons. The method further includes disabling the third subset of synapses; providing a first input vector as an input to the SNN with the third subset of synapses disabled; determining a first steady state condition for the SNN when the first input vector is provided as the input to the SNN and the third subset of synapses is disabled; determining first spiking rates of at least a subset of the plurality of neurons associated with the first steady state condition; enabling the third subset of synapses; providing a modified version of the first input vector as an input to the SNN with the third subset of synapses enabled; determining a second steady state condition for the SNN when the modified version of the first input vector is provided as the input to the SNN and the third subset of synapses is enabled; determining second spiking rates of the first subset of neurons and the second subset of neurons, where the second spiking rates are associated with the second steady state condition; and modifying weights of the plurality of synapses based on a difference between the first spiking rates and the second spiking rates.

Example 16 may include the subject matter of example 15, where first steady state spiking rates and second steady state spiking rates are to be determined for both the first and second subsets of neurons.

Example 17 may include the subject matter of any one of examples 15-16, where the weight values are to be modified according to equations:

$$F \leftarrow F + \eta_3(b_1 - b_2)a_2^T$$

$$D \leftarrow D + \eta_2(b_1 - b_2)a_2^T, \text{ and}$$

$$G \leftarrow G + \eta_1(a_2 - a_1)a_2^T,$$

where G includes a matrix of weight values for the second subset of synapses, D includes a matrix of weight values for the first subset of synapses, $a_1$ includes first steady state spiking rates of the second subset of neurons, $a_2$ includes second steady state spiking rates of the second subset of neurons, $b_1$ includes first steady state spiking rates of the first subset of neurons, $b_2$ includes second steady state spiking rates of the first subset of neurons, includes a first learning rate, and $\eta_2$ includes a second learning rate.

Example 18 may include the subject matter of any one of examples 15-17, where a modified version of the respective input vector is to be provided to the SNN when the third subset of synapses are enabled and the second steady state spiking rates are determined with the modified version of the respective input vector provided to the SNN.

Example 19 may include the subject matter of example 18, where the respective input vector includes $x_i$ and the modified version of the respective input vector is to be according to $(1-\gamma) x_i$, where $\gamma$ is a variance coefficient.

Example 20 may include the subject matter of any one of examples 15-19, where the SNN is to be defined for a neuromorphic computing device to implement the SNN.

Example 21 may include the subject matter of example 20, where defining the SNN includes providing definition data to the neuromorphic computing device to cause the neuromorphic computing device to implement the SNN.

Example 22 may include the subject matter of example 21, where the plurality of synapses are to be defined within the neuromorphic computing device in one or more routing tables of the neuromorphic computing device.

Example 23 may include the subject matter of any one of examples 21-22, where the neuromorphic computing device includes a plurality of neuromorphic processing cores interconnected by one or more routers of the neuromorphic computing device.

Example 24 may include the subject matter of any one of examples 15-23, where the instructions, when executed, further cause the machine to determine final steady state spiking rates for at least the second subset of neurons corresponding to the particular set of weight values.

Example 25 may include the subject matter of example 24, where the final steady state spiking rates are to correspond to values of an unknown vector in the equation.

Example 26 may include the subject matter of example 25, where the number of neurons in the SNN is based on dimensions of the unknown matrix and a dimension of the unknown vector.

Example 27 may include the subject matter of any one of examples 15-26, where random weight values are to be applied to the plurality of synapses as initial weight values for the plurality of synapses.

Example 28 may include the subject matter of any one of examples 15-27, where the second subset of neurons are to correspond to a plurality of clusters and the unknown matrix is to correspond to unknown features of the plurality of clusters.

Example 29 may include means to perform the method of any one of examples 15-28.

Example 30 may include the subject matter of example 29, where the means include a computer-readable medium with instructions stored thereon and executable to perform the method of any one of examples 15-28.

Example 31 is a system including: a neuromorphic computing device including one or more routers and a plurality of neuromorphic cores interconnected by the one or more routers, where each neuromorphic core in the plurality is to implement one or more artificial neurons in a particular spiking neural network. Each neuromorphic core may include: a processor; a memory to store one or more routing tables; a respective dendrite process to be executed using the processor; and a respective soma process to be executed using the processor, where the one or more routing tables define a plurality of artificial synapses to interconnect the artificial neurons to define a particular spiking neural network (SNN). The particular SNN may include: a first layer of artificial neurons, a second layer of artificial neurons, a first subset of the plurality of synapses to define feedforward connections from neurons in the first layer neurons to neurons in the second layer, a second subset of the plurality of synapses to define recurrent connections between neurons in the second layer, and a third subset of the plurality of synapses to define feedback connections from neurons in the second layer to neurons in the first layer. The system may further include logic to: provide a set of input vectors to the particular SNN; selectively enable and disable the third subset of synapses; and iteratively adjust weight values for at least the first subset of synapses based on the set of input vectors to derive a solution to an equation including an unknown matrix variable and an unknown vector variable.

Example 32 may include the subject matter of example 31, where the logic is to be executed on a machine separate from the neuromorphic computing device.

Example 33 may include the subject matter of any one of examples 31-32, where at least a portion of the logic is resident on the neuromorphic computing device.

Example 34 may include the subject matter of any one of examples 31-33, where the plurality of neuromorphic cores are configurable to implement any one of a plurality of different spiking neural networks.

Example 35 may include the subject matter of example 34, where the logic is further to provide one or more inputs to cause the neuromorphic computing device to implement a particular one of the plurality of different spiking neural networks.

Example 36 may include the subject matter of any one of examples 1-33, where the inputs or input vectors are images.

Example 37 may include the subject matter of example 36, where the unknown matrix corresponds to features for use in classifying the images.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, wherein the instructions when executed on a machine, cause the machine to:
    define a spiking neural network (SNN), wherein the SNN is to comprise: a plurality of neurons and a plurality of synapses, wherein a first subset of the plurality of synapses defines feed-forward connections from a first subset of the plurality of neurons to a second subset of the plurality of neurons, a second subset of the plurality of synapses defines recurrent connections between the second subset of neurons, and a third subset of the plurality of synapses defines feedback connections from the second subset of neurons to the first subset of neurons;
    provide a plurality of input vectors to the SNN to iteratively modify weight values of the plurality of synapses, wherein iteratively modifying weight values of the plurality of synapses is to comprise, in each iteration:
        providing one of the plurality of input vectors to the SNN with the third subset of synapses disabled;
        determining first steady state spiking rates of at least the second subset of neurons with the respective input vector provided and the third subset of synapses disabled;
        determining second spiking rates of at least the second subset of neurons with the third subset of synapses enabled and based on the respective input vector;
        modifying weight values of the plurality of synapses based on a difference between the first spiking rates and the second spiking rates;
    determine a convergence of weight values of the plurality of synapses to a particular set of weight values, wherein the particular set of weight values are to correspond to an unknown matrix in an equation.

2. The storage medium of claim 1, wherein first steady state spiking rates and second steady state spiking rates are to be determined for both the first and second subsets of neurons.

3. The storage medium of claim 1, wherein the weight values are to be modified according to equations:

$$F \leftarrow F + \eta_3(b_1 - b_2)a_2^T$$

$$D \leftarrow D + \eta_2(b_1 - b_2)a_2^T, \text{ and}$$

$$G \leftarrow G + \eta_1(a_2 - a_1)a_2^T,$$

where G comprises a matrix of weight values for the second subset of synapses, D comprises a matrix of weight values for the first subset of synapses, $a_1$ comprises first steady state spiking rates of the second subset of neurons, $a_2$ comprises second steady state spiking rates of the second subset of neurons, $b_1$ comprises first steady state spiking rates of the first subset of neurons, $b_2$ comprises second steady state spiking rates of the first subset of neurons, $\eta_1$ comprises a first learning rate, and $\eta_2$ comprises a second learning rate.

4. The storage medium of claim 1, wherein a modified version of the respective input vector is to be provided to the SNN when the third subset of synapses are enabled and the second steady state spiking rates are determined with the modified version of the respective input vector provided to the SNN.

5. The storage medium of claim 4, wherein the respective input vector comprises $x_i$ and the modified version of the respective input vector is to be according to $(1-\gamma) x_i$, where $\gamma$ is a variance coefficient.

6. The storage medium of claim 1, wherein the SNN is to be defined for a neuromorphic computing device to implement the SNN.

7. The storage medium of claim 6, wherein defining the SNN comprises providing definition data to the neuromorphic computing device to cause the neuromorphic computing device to implement the SNN.

8. The storage medium of claim 7, wherein the plurality of synapses are to be defined within the neuromorphic computing device in one or more routing tables of the neuromorphic computing device.

9. The storage medium of claim 7, wherein the neuromorphic computing device comprises a plurality of neuromorphic processing cores interconnected by one or more routers of the neuromorphic computing device.

10. The storage medium of claim 1, wherein the instructions, when executed, further cause the machine to determine final steady state spiking rates for at least the second subset of neurons corresponding to the particular set of weight values.

11. The storage medium of claim 10, wherein the final steady state spiking rates are to correspond to values of an unknown vector in the equation.

12. The storage medium of claim 11, wherein the number of neurons in the SNN is based on dimensions of the unknown matrix and a dimension of the unknown vector.

13. The storage medium of claim 1, wherein random weight values are to be applied to the plurality of synapses as initial weight values for the plurality of synapses.

14. The storage medium of claim 1, wherein the second subset of neurons are to correspond to a plurality of clusters and the unknown matrix is to correspond to unknown features of the plurality of clusters.

15. A method comprising:
defining a spiking neural network (SNN) comprising a plurality of artificial neurons interconnected by a plurality of artificial synapses, wherein the SNN is to comprise:
a first subset of the plurality of synapses to define feedforward connections from a first subset of the plurality of neurons to a second subset of the plurality of neurons,
a second subset of the plurality of synapses to define recurrent connections between the second subset of neurons, and
a third subset of the plurality of synapses to define feedback connections from the second subset of neurons to the first subset of neurons;
disabling the third subset of synapses;
providing a first input vector as an input to the SNN with the third subset of synapses disabled;
determining a first steady state condition for the SNN when the first input vector is provided as the input to the SNN and the third subset of synapses is disabled;
determining first spiking rates of at least a subset of the plurality of neurons associated with the first steady state condition;
enabling the third subset of synapses;
providing a modified version of the first input vector as an input to the SNN with the third subset of synapses enabled;
determining a second steady state condition for the SNN when the modified version of the first input vector is provided as the input to the SNN and the third subset of synapses is enabled;
determining second spiking rates of the first subset of neurons and the second subset of neurons, wherein the second spiking rates are associated with the second steady state condition; and
modifying weights of the plurality of synapses based on a difference between the first spiking rates and the second spiking rates.

16. A system comprising:
a neuromorphic computing device comprising:
one or more routers;
a plurality of neuromorphic cores interconnected by the one or more routers, wherein each neuromorphic core in the plurality is to implement one or more artificial neurons in a particular spiking neural network and comprises:
a processor;
a memory to store one or more routing tables;
a respective dendrite process to be executed using the processor; and
a respective soma process to be executed using the processor,
wherein the one or more routing tables define a plurality of artificial synapses to interconnect the artificial neurons to define a particular spiking neural network (SNN), and the particular SNN is to comprise:
a first layer of artificial neurons,
a second layer of artificial neurons,
a first subset of the plurality of synapses to define feedforward connections from neurons in the first layer to neurons in the second layer,
a second subset of the plurality of synapses to define recurrent connections between neurons in the second layer, and
a third subset of the plurality of synapses to define feedback connections from neurons in the second layer to neurons in the first layer; and
logic to:
provide a set of input vectors to the particular SNN;
iteratively adjust weight values for the plurality of synapses, wherein iteratively modifying weight values for the plurality of synapses is to comprise, in each iteration:
providing one of the plurality of input vectors to the SNN with the third subset of synapses disabled;
determining first steady state spiking rates of at least the second subset of neurons with the respective input vector provided and the third subset of synapses disabled:
determining second spiking rates of at least the second subset of neurons with the third subset of synapses enabled and based on the respective input vector; and
modifying weight values of the plurality of synapses based on a difference between the first spiking rates and the second spiking rates; and
determine a convergence of weight values of the plurality of synapses to a particular set of weight values, wherein the particular set of weight values are to correspond to an unknown matrix in an equation.

17. The system of claim 16, wherein the logic is to be executed on a machine separate from the neuromorphic computing device.

18. The system of claim 16, wherein at least a portion of the logic is resident on the neuromorphic computing device.

19. The system of claim 16, wherein the plurality of neuromorphic cores are configurable to implement any one of a plurality of different spiking neural networks.

20. The system of claim 19, wherein the logic is further to provide one or more inputs to cause the neuromorphic computing device to implement a particular one of the plurality of different spiking neural networks.

* * * * *